US008404212B2

(12) United States Patent
Norton et al.

(10) Patent No.: US 8,404,212 B2
(45) Date of Patent: Mar. 26, 2013

(54) APPARATUS WITH HIGH SURFACE AREA NANOSTRUCTURES FOR HYDROGEN STORAGE, AND METHODS OF STORING HYDROGEN

(75) Inventors: Grant Norton, Pullman, WA (US); David McIlroy, Moscow, ID (US)

(73) Assignees: Washington State University Research Foundation, Pullman, WA (US); Idaho Research Foundation, Inc., Moscow, ID (US)

( * ) Notice: Subject to any disclaimer, the term of this patent is extended or adjusted under 35 U.S.C. 154(b) by 322 days.

(21) Appl. No.: 12/836,728

(22) Filed: Jul. 15, 2010

(65) Prior Publication Data

US 2010/0276304 A1 Nov. 4, 2010

Related U.S. Application Data

(63) Continuation of application No. 11/961,928, filed on Dec. 20, 2007, now Pat. No. 7,771,512, which is a continuation-in-part of application No. PCT/US2006/024435, filed on Jun. 23, 2006.

(60) Provisional application No. 60/876,646, filed on Dec. 22, 2006, provisional application No. 60/744,733, filed on Apr. 12, 2006, provisional application No. 60/693,683, filed on Jun. 24, 2005.

(51) Int. Cl.
*B01D 53/02* (2006.01)

(52) U.S. Cl. ....... 423/648.1; 96/146; 502/526; 977/768; 977/777; 977/948

(58) Field of Classification Search .............. 95/90, 116, 95/148, 900; 96/108, 143, 146, 154; 502/407, 502/526; 206/0.7; 423/648.1; 977/768, 977/777, 948

See application file for complete search history.

(56) References Cited

U.S. PATENT DOCUMENTS

| 4,142,962 | A | 3/1979 | Yates et al. |
| 4,921,823 | A | 5/1990 | Furneaux et al. |
| 5,879,827 | A | 3/1999 | Debe et al. |
| 6,297,063 | B1 | 10/2001 | Brown et al. |
| 6,340,822 | B1 | 1/2002 | Brown et al. |
| 6,589,312 | B1* | 7/2003 | Snow et al. ............... 75/255 |
| 6,638,348 | B2 | 10/2003 | Kuriiwa et al. |
| 6,672,077 | B1 | 1/2004 | Bradley et al. |
| 6,709,497 | B2 | 3/2004 | Myasnikov et al. |
| 6,858,521 | B2 | 2/2005 | Jin |

(Continued)

FOREIGN PATENT DOCUMENTS

| EP | 1129990 | 5/2001 |
| EP | 1426756 | 9/2004 |

(Continued)

OTHER PUBLICATIONS

McIlroy, D.N. et al., Nanospring formation—unexpected catalyst mediated growth, J. Phys.: Condens. Matter 16 (2004), pp. R415-R440, Mar. 12, 2004.

(Continued)

*Primary Examiner* — Frank Lawrence, Jr.
(74) *Attorney, Agent, or Firm* — China Science Law Group

(57) ABSTRACT

Method and apparatus for storing hydrogen. One embodiment of such a method comprises providing a storage apparatus having a substrate and a nanostructure mat on at least a portion of a side of the substrate. The nanostructure mat comprises a plurality of nanostructures having a surface ionization state which causes more than one layer of hydrogen to adsorb onto the nanostructures. The method can also include exposing the nanostructure mat to hydrogen such that more than one layer of hydrogen adsorbs onto the nanostructures.

20 Claims, 8 Drawing Sheets

U.S. PATENT DOCUMENTS

| | | | |
|---|---|---|---|
| 6,991,733 | B2 | 1/2006 | Kin et al. |
| 6,991,773 | B2 | 1/2006 | Jhi et al. |
| 7,303,736 | B2 * | 12/2007 | Williamson et al. .......... 423/324 |
| 7,323,043 | B2 | 1/2008 | Finamore |
| 7,326,281 | B2 | 2/2008 | Fujita et al. |
| 7,416,583 | B2 * | 8/2008 | Colibaba-Evulet ............. 96/108 |
| 7,425,232 | B2 | 9/2008 | Wang et al. |
| 2002/0172963 | A1 | 11/2002 | Kelley et al. |
| 2003/0167778 | A1 | 9/2003 | Bradley et al. |
| 2004/0023087 | A1 | 2/2004 | Redmond |
| 2004/0112964 | A1 | 6/2004 | Empedocles et al. |
| 2004/0265212 | A1 | 12/2004 | Varadan et al. |
| 2005/0040090 | A1 | 2/2005 | Wang et al. |
| 2005/0053542 | A1 | 3/2005 | Harutyunyan |
| 2005/0077496 | A1 | 4/2005 | Shimizu et al. |
| 2007/0039299 | A1 | 2/2007 | Zeller et al. |
| 2007/0092437 | A1 | 4/2007 | Kwon et al. |
| 2009/0000192 | A1 | 1/2009 | Norton et al. |
| 2010/0215915 | A1 | 8/2010 | Norton et al. |
| 2011/0053020 | A1 | 3/2011 | Norton et al. |

FOREIGN PATENT DOCUMENTS

| | | |
|---|---|---|
| EP | 1426756 | 6/2009 |
| JP | 2001-519594 | 10/2001 |
| WO | 2005/033001 | 4/2005 |
| WO | WO-2005033001 A2 | 4/2005 |
| WO | 2006122697 | 11/2006 |
| WO | 2007002369 | 1/2007 |

OTHER PUBLICATIONS

Zhang, H-F. et al., Synthesis, Characterization, and Manipulation of Helical SiO2 Nanosprings, Nano Letters (2003), vol. 3, No. 5, pp. 577-580, Apr. 4, 2003.

LaLonde, A.D. et al., Controlled growth of gold nanoparticles on silica nanowires, J. Mater. Res., vol. 20, No. 11, pp. 3021-3027, Nov. 11, 2005.

Extended European Search Report issued by European Patent Office on Jan. 12, 2012, 19 pages.

Office Action issued May 28, 2012 in Japanese Application No. 2008-518419, 5 pages.

Office Action (translation) issued May 13, 2012 in Israel Application No. 188363, 1 page.

Beaux, M., Wang, L., Zhang, D., Gangadean, D., McIlroy, D., Kwon, N., Dziewanowska, K. and Bohach, G., Fibronectin Bonding to Nanowires and Their Internalization by Epithelial Cells, J. of Biomedical Nanotechnology 2 (2006).

Bekyarova, E., Ni, Y., Malarkey, E., Montana, V., McWilliarns, J., Haddon, R. and Parpura, V., Applications of Carbon Nanotubes in Biotechnology and Biomedicine, J. of Biomedical Nanotechnology 1 3 (2005).

Bell, A.T. The impact of nanoscience on heterogeneous catalysis. Science 299, 1688 (2003).

Boudjahem, A-G., S. Monteverdi, M. Mercy, D. Ghanbaja and M.M. Bettahar. Nickel nanoparticles supported on silica of low surface area: Hydrogen chemisorption and TPD and catalytic properties. Catal. Lett. 84, 115 (2002).

Campbell, C.T. The active site in nanoparticle gold catalysis. Science 306, 234 (2004).

Che, G., B.B. Lakshrni, C.R. Martin and E.R. Fisher. Metal-nanocluster-filled carbon nanotubes: Catalytic properties and possible applications in electrochemical energy storage and production. Langmuir 15, 750 (1999).

Chen, P. et al. Interaction of hydrogen with metal nitrides and imides, Nature 420 21, 302-304, Nov. 2002.

Chen, P., X. Wu, J. Lin, and K.L. Tan. High H2 uptake by alkali-doped carbon nanotubes under ambient pressure and moderate temperatures. Science 285, 91 (1999).

Compagnini, G., A.A. Scalisi, O. Puglisi, and C. Spinella. Synthesis of gold colloids by laser ablation in thiol-alkane solutions. J. Mater. Res. 19, 2795 (2004).

Crabtree, G.W. et al. The Hydrogen Economy, Physics Today, 57, 39-44, Dec. 2004.

Dalacu, D. and Martinu, L., Spectroellipsometric characterization of plasma-deposited Au/SiO2 nanocomposite films, J. Appl. Phys. 87 228 (2000).

Dalacu, D. and Martinu, L., Temperature dependence of the surface plasmon resonance of Au/SiO2 nanocomposite films, Appl. Phys. Lett. 77 4283 (2000).

Darkrim, F.L. et al. Review of hydrogen storage by adsorption in carbon nanotubes, International Journal of Hydrogen Energy 27 (2002) 193-202.

Department of Energy, Office of Science, Argonne National Laboratory: Basic Research Needs for the Hydrogen Economy, 2003.

Dillon, A.C., K.M. Jones, T.A. Bekkedahl, C.H. Kiang, D.S. Bethune, and M.J. Heben. Storage of hydrogen in single-walled carbon nanotubes. Nature (London) 386, 377 (1997).

Dobrokhotov V, McIlroy, D, Norton G, Abuzir, M, Yeh, A, Stevenson J, Pouy I, Bochenek R, Cartwright M, Wang L, Dawson J, Beaux M and Berven C, Principles and mechanisms of gas sensing by GaN nanowires functionalized with gold nanoparticles, J. Appl. Phys. 99, 104302 (2006).

Duan, X., Wang, J. and Lieber, C.M., Synthesis and optical properties of gallium arsenide nanowires, Appl. Phys. Lett. 76 1116 (2000).

Fukuoka, A., Araki, H., Kimura, J., Sakamoto, Y., Higuchi, T., Sugimoto, N., Inagaki, S., and Ichikawa, M., Template synthesis of nanoparticle arrays of gold, platinum, and palladium in mesoporous silica films and powders, J. Mater. Chem. 14, 752 (2004).

Guczi, L, G. Petoe, A. Beck, K. Frey, O. Geszti, G. Molnar, and C. Daroczi. Gold nanoparticles deposited on SiO2/Si (100): Correlation between size, electron structure, and activity in CO oxidation. J. Am. Chem. Soc. 125, 4332 (2003).

Gutierrez-Wing, C., J.A. Ascencio, M. Perez-Alvarez, M. Marin-Almazo, and M. Jose-Yacaman. On the structure and formation of self-assembled lattices of gold nanoparticles. J. Cluster Sci. 9, 529 (1998).

Han, L., W. Wu, F.L. Kirk, J. Luo, M.M. Maye, N.N. Kariuki, Y. Lin, C-M. Wang, and C-J. Zhong. A Direct Route toward Assembly of Nanoparticle-Carbon Nanotube Composite Materials. Langmuir 20, 6019 (2004).

Haruta, M. Size—and support-dependency in the catalysis of gold. Catal. Today. 36, 153 (1997).

Haruta, M. When gold is not noble: catalysis by nanoparticles. Chem. Rec. 3, 75 (2003).

He, Z., J. Chen, D. Liu, H. Tang, W. Deng & Y. Kuang. Deposition and electrocatalytic properties of platinum nanoparticles on carbon nanotubes for methanol electrooxidation. Mater Chem. Phys. 85, 396 (2004).

Hirscher, M. et al. Are carbon nanostructures an efficient hydrogen storage medium? Journal of Alloys and Compounds 356-357 (2003) 433-437.

Hostetler, M.J., J.E. Wingate, C-J Zhong, J.E. Harris, R.W. Vachet, M.R. Clark, J.D. Londono, S.J. Green, J.J. Stokes, G.D. Wignall, G.L. Glish, M.D. Porter, N.D. Evans, and R.W. Murray. Alkanethiolate gold cluster molecules with core diameters from 1.5 to 5.2 nm: Core and monolayer properties as a function of core size. Langmuir 14, 17 (1998).

International Search Report and Written Opinion for International Application No. PCT/US2007/088438, Oct. 20, 2008.

International Search Report and Written Opinion for International Application No. PCT/US2006/024435, Apr. 9, 2007.

Ivanova, S., C. Petit, and V. Pitchon. A new preparation method for the formation of gold nanoparticles on an oxide support. Appl. Catal., A: General 267, 191 (2004).

Jhi, S-H., and Y-K. Kwon. Glassy materials as a hydrogen storage medium: Density functional calculations, Phys. Rev. B. 71, 035408 (2005).

Jhi, S-H., and Y-K. Kwon. Hydrogen adsorption on boron nitride nanotubes: A path to room temperature hydrogen storage. Phys. Rev. B 69, 245407 (2004).

Jhi, S-H., Y-K. Kwon, K. Bradley, and J-C.P. Gabriel. Hydrogen storage by physisorption: Beyond carbon. Solid State Comm. 129, 769 (2004).

Jiang, L., and L. Gao. Modified carbon nanotubes: an effective way to selective attachment of gold nanoparticles. Carbon 41, 2923 (2003).

Kovtyukhova N., Martin B, Mbindyo J, Smith P, Razavi B, Mayer T and Mallouk T, 2001, Layer-by-Layer Assembly of Rectifying Junctions in and on Metal Nanowires, J. Phys.Chem. B 105 8762.

LaLonde, A.D. et al., Metal coatings on SiC nanowires by plasma-enhanced chemical vapor deposition, J. Mater. Res., 20, 549 (2005).

LaLonde, A.D., et al., Controlled growth of gold nanoparticles on silica nanowires, J. Mater. Res., 20, 3021 (2005).

Leng, H.Y. et al. New Metal-N-H System Composed of $Mg(NH_2)_2$ and LiH for Hydrogen Storage, J. Phys. Chem. B 108 26, 8763-8765 (2004).

Liu, C., Y.Y. Fan, M. Liu, H.T. Gong, H.M. Cheng, and M.S. Dresselhaus. Hydrogen storage in single-walled carbon nanotubes at room temperature. Science 286, 1127 (1999).

Liu, Z., L.M. Gan, L. Hong, W. Chen & J.Y. Lee. Carbon-supported Pt nanoparticles as catalysts for proton exchange membrane fuel cells. J. Power Sources 139, 73 (2005).

Ma, X., N. Lun, and S. Wen. Formation of gold nanoparticles supported on carbon nanotubes by using an electroless plating method. Diamond & Relat. Mater. 14, 68 (2005).

Magnusson, M.H., K. Deppert, J-O. Malm, J-O. Bovin, and L. Samuelson. Gold nanoparticles: Production, reshaping, and thermal charging. J. Nanoparticle Res. 1, 243 (1999).

Marella, M. et al. Synthesis of carbon nanofibers and measurements of hydrogen storage, Carbon (2006) 1404-1413.

Matsumoto, T., T. Komatsu, H. Nakano, K. Arai, Y. Nagashima, E. Yoo, T. Yamazaki, M. Kijima, H. Shimizu, Y. Takasawa and J. Nakamura. Efficient usage of highly dispersed Pt on carbon nanotubes for electrode catalysts of polymer electrolyte fuel cells. Catal. Today 90, 277 (2004).

McIlroy, D., Zhang, D. and Kranov, Y., Nanosprings, Appl. Phys. Lett. 79 1540 (2001).

McIlroy, D.N., A. Alkhateeb, D. Zhang, D.E. Aston, A.C. Marcy, and M.G. Norton. Nanospring formation—unexpected catalyst mediated growth. J. Phys.: Condens. Matter 16, R415 (2004).

McIlroy, D.N., D. Zhang, R.M. Cohen, J. Wharton, Y. Geng, M.G. Norton, G. De Stasio, B. Gilbert, L. Perfetti, J.H. Streiff, B. Broocks, and J.L. McHale. Electronic and dynamic studies of boron carbide nanowires. Phys. Rev. B 60, 4874 (1999).

Mpourmpakis, G. et al. SiC Nanotubes: A Novel Material for Hydrogen Storage, Nano Letters, Vo. 6, No. 8, pp. 1581-1583, Aug. 2006.

Office Action (translation) issued Dec. 25, 2009 in People's Republic of China Application No. 200680022817.2.

Office Action (translation) issued Nov. 30, 2009 in Korea Application No. 10-2008-7001985.

Okamoto, H. and Massalski, T., The Au—Si (Gold-Silicon) System, Bull. Alloy Phase Diagrams 4 2 (1983).

Okumura, M., S. Nakamura, S. Tsubota, T. Nakamura, M. Azuma, and M. Haruta. Chemical vapor deposition of gold on Al2O3, SiO2, and TiO2 for the oxidation of CO and of H2. Catal. Lett. 51, 53 (1998).

Panigrahi, S., S. Kundu, S.K. Ghosh, S. Nath, and T. Pal. General method of synthesis for metal nanoparticles. J. Nanoparticle Res. 6, 411 (2004).

Pinkerton, F.E. et al. Hydrogen Desorption Exceeding Ten Weight Percent from the New Quarterly Hydride Li3BN2H8, J. Phys. Chem. B, vol. 109, No. 1, pp. 6-8, 2005.

Pol, V.G., A. Gedanken, and J. Calderon-Moreno. Deposition of gold nanoparticles on silica spheres: A sonochemical approach. Chem. Mater. 15, 1111 (2003).

Salem, A., Searson, P. and Leong, K., Multifunctional nanorods for gene delivery, Nat. Mater. 2 668 (2003).

Satishkumar, B.C., E.M. Vogl, A. Govindaraj, and C.N.R. Rao. The decoration of carbon nanotubes by metal nanoparticles. J. Phys. D: Appl. Phys. 29, 3173 (1996).

Schimpf, S., M. Lucas, C. Mohr, U. Rodemerck, A. Briickner, J. Radnik, H. Hofmeister, and P. Claus. Supported gold nanoparticles: in-depth catalyst characterization and application in hydrogenation and oxidation reactions. Catal. Today 72, 63 (2002).

Shen, D., Chen, D., Tang, K., Qian, Y. and Zhang, S., Silicon carbide hollow nanospheres, nanowires and coaxial nanowires, Chem. Phys. Lett. 375 177 (2003).

Tang, H., J. Chen, L. Nie, D. Liu, W. Deng, Y. Kuang and S. Yao. High dispersion and electrocatalytic properties of platinum nanoparticles on graphitic carbon nanofibers (GCNFs). J. Colloid Interface Sci. 269, 26 (2004).

Tang, Z., Kotov, N. and Giersig, M., Spontaneous Organization of Single CdTe Nanoparticles into Luminescent Nanowires, Science 297 237 (2002).

Taubert, A., U-M. Wiesler, and K. Muellen. Dendrimer-controlled one-pot synthesis of gold nanoparticles with a bimodal size distribution and their self-assembly in the solid state. J. Mater. Chem. 13, 1090 (2003).

Wagner, R. and Ellis, W., Vapor-Liquid-Solid Mechanism of Single Crystal Growth, Appl. Phys. Lett. 4 89 (1964).

Wang, J., T. Zhu, J. Song, and Z. Liu. Gold nanoparticulate film bound to silicon surface with self-assembled monolayers. Thin Solid Films 327-329, 591 (1998).

Wang, L. et al., "High yield synthesis and lithography of silica-based nanospring mats," Nanotechnology, vol. 17, pp. S298-S303, May 19, 2006, abstract, URL: <http://www.iop.org/EJ/abstract/0957-4484/17/11/S12>.

Wu, S.H., and D-H. Chen. Synthesis and characterization of nickel nanoparticles by hydrazine reduction in ethylene glycol. J. Colloid Interface Sci. 259, 282 (2003).

Wu, Y. and Yang, P., Direct Observation of Vapor-Liquid-Solid Nanowire Growth, J. Am. Chem. Soc. 123 3165 (2001).

Zhang Y., Q. Zhang, Y. Li, N. Wang and J. Zhu. Coating of carbon nanotubes with tungsten by physical vapor deposition. Solid State Commun. 115, 51 (2000).

Zhang, D., Alkhateeb, A., Han, H., Mahmood, H. and McIlroy, D., Silicon Carbide Nanosprings, Nano Lett. 3 983 (2003).

Zhang, D., D.N. McIlroy, Y. Geng, and M.G. Norton. Growth and characterization of boron carbide nanowires. J. Mater. Sci. Letters 18, 349 (1999).

Zhang, H-F., C-M. Wang, E.C. Buck, and L-S. Wang. Synthesis, characterization, and manipulation of helical SiO2 nanosprings. Nano Lett. 3, 577 (2003).

Zheng, M., Zhang, L., Li, G., Zhang, X. and Wang, X, Ordered indium-oxide nanowire arrays and their photoluminescence properties, Appl. Phys. Lett. 79 839 (2001).

Zuttel, A. Hydrogen storage in carbon nanostructures, International Journal of Hydrogen Energy 27 (2002) 203-212.

International Search Report and Written Opinion issued Mar. 30, 2009 in International Application No. PCT/US2008/082884.

Office Action (translation) issued Aug. 17, 2011 in Israel Application No. 188363, 3 pages.

Search Report and Written Opinion issued Aug. 19, 2010 in Singapore Application No. 200718932-7, 11 pages.

Office Action issued Nov. 16, 2012 in U.S. Appl. No. 11/993,452, 9 pages.

* cited by examiner

APPARATUS WITH HIGH SURFACE AREA NANOSTRUCTURES FOR HYDROGEN STORAGE, AND METHODS OF STORING HYDROGEN

CROSS-REFERENCE TO RELATED APPLICATIONS

The present application is a continuation of U.S. application Ser. No. 11/961,928, filed on Dec. 20, 2007, now U.S. Pat. No. 7,771,512, which claims the benefit of U.S. Provisional Application No. 60/876,646, filed on Dec. 22, 2006, both of which are incorporated herein by reference. U.S. application Ser. No. 11/961,928 is a continuation-in-part of International Application No. PCT/US2006/024435(shown in Appendix A), filed on Jun. 23, 2006, which claims the benefit of U.S. Provisional Application Nos. 60/744,733, filed on Apr. 12, 2006, and 60/693,683, filed on Jun. 24, 2005, all of which are incorporated herein by reference.

STATEMENT REGARDING FEDERALLY SPONSORED RESEARCH AND DEVELOPMENT

The invention was funded, in part, by the National Science Foundation under Idaho EPSToR grant EPS0132626. The United States government has certain rights in the invention.

TECHNICAL FIELD

The present invention relates to the use of nanostructures having high surface areas with desirable ionic properties for storing hydrogen.

BACKGROUND

The energy crisis of the 1970's has reemerged as a global issue with an increase in competition for existing oil resources. Rising standards of living, increased industrialization, and a growing worldwide population are driving this competition. Among the various alternative energy strategies, a hydrogen-based energy infrastructure is a particularly promising approach that offers several advantages. First, hydrogen is the third most abundant element and offers the highest energy density per unit weight of any known fuel. The heat of combustion for $H_2$ (125 MJ/kg), for example, is about 300% greater than that of gasoline (43 MJ/kg). Second, hydrogen is the lightest element and would therefore enhance efficiency by reducing fuel storage weight relative to petroleum fuels. Third, hydrogen is also a renewable resource and can be produced from a variety sources, such as steam reforming of natural gas, electrolysis of water, and photosynthesis of $CO_2$, $H_2O$ and sunlight to $H_2$ and $O_2$. Fourth, hydrogen is environmentally friendly and may lead to reducing greenhouse gas emissions because water is the byproduct of a hydrogen combustion engine or a hydrogen fuel cell.

One significant challenge of implementing a hydrogen-based energy infrastructure is storing hydrogen in sufficient quantities for transportation and other widespread applications. For example, high pressure storage of hydrogen for such applications is impractical because hydrogen ignites at atmospheric pressures in concentrations as low as about 4% by volume. One alternative to high-pressure storage of $H_2$ is cryogenic liquification. Although liquification of hydrogen clearly has advantages over high-pressure storage, such as a higher energy density and the ability to operate at atmospheric pressure, it is not practical because the energy loss of liquefying hydrogen and prolonged cryogenic cooling can be as high as 40% (Crabtree, et al. *Physics Today* 57, 39, 2004). Another alternative to high pressure storage is combining hydrogen with metals in the form of metal hydrides. Some light metals, such as magnesium and lithium, react with hydrogen to produce metal hydrides that can later release high purity hydrogen similar to water in a sponge. The total adsorbed hydrogen is generally 1%-2% in gravimetric density (ratio of adsorbed $H_2$ mass to the total mass), and in some cases storage densities as high as 5%-7% have been reported (Chen, et al., *Nature* 420, 302, 2002; Leng et al., *J. Phys. Chem. B* 108, 8763, 2004; Pinkerton, et al., *J. Phys. Chem. B* 109, 6, 2005). Metal hydrides, however, are not practical in many applications because high temperatures (~300° C.) are needed to achieve sufficient rates of hydrogen release (Crabtree, et al. *Physics Today* 57, 39, 2004).

Another alternative for storing hydrogen is to adsorb hydrogen onto the surfaces of nanomaterials that facilitate low temperature desorption. Lightweight nanomaterials (e.g. nanotubes, nanohorns, and other row one and row two main group structures) have high surface area to weight ratios that can achieve high storage densities, but as indicated in a recent Department of Energy (DOE) report, the maximum storage of adsorped hydrogen is currently only 4.1% (Department of Energy, Office of Science, Argonne National Laboratory: *Basic Research Needs for the Hydrogen Economy*, 2003). To meet even the 2010 hydrogen storage target of 6%, multilayer adsorption of $H_2$ is desirable (Department of Energy, Office of Science, Argonne National Laboratory: *Basic Research Needs for the Hydrogen Economy*, 2003). Several groups have investigated the use of different types of nanostructured carbon, such as activated carbon, nanotubes, and nanofibers, for hydrogen uptake (Dillon, et al., *Nature* 386, 377, 1997; Züttel, et al., *Int. J. Hydrogen Energy* 27, 203, 2002; Lamari, et al., *Int. J. Hydrogen Energy* 27, 193, 2002; Hirscher, et al., *J. Alloys Compd.* 356-357, 433, 2003). However, carbon nanostructures have several limitations including cryogenic desorption temperatures and low adsorption rates at room temperature. In the case of carbon nanotubes, hydrogen capacity rates have been difficult to reproduce/confirm as noted by the reported gravimetric storage capacities ranging from 0.25% to an unrealistic 20% (Chen, et al., *Science* 285, 91, 1999; Mpourmpakis, et al., *Nano Lett.* 6, 1581, 2006; Marella, et al., *Carbon* 44, 1404 2006).

Oxide ceramics may represent an alternative to carbon-based materials for hydrogen storage applications. It has been suggested in the art that ceramic oxide nanostructures (e.g. nanotubes and other materials with nanoscale structures) may provide alternative compositions for use in storage. However, little data and few examples have been provided to yield sufficient information to predict suitable compositions (Bradley, et al, U.S. Pat. No. 6,672,077). Theoretical studies have indicated that vitreous boron oxide ($B_2O_3$) exhibits suitable surface properties for $H_2$ storage (Jhi, et al, *Phys. Rev. B* 69, 245407, 2005; Jhi, et al., *Phys. Rev. B* 71, 035408, 2005). Some experimental support exists for the use of boron oxide derivatives to store hydrogen, but these also reportedly have cryogenic desorption temperatures that limit practical utility (Jhi, et al, U.S. Pat. No. 6,991,773). These investigations suggest the possibility for use of boron oxide ceramics in hydrogen storage applications based upon the energetics of the $H_2$—$B_2O_3$ interactions, but many practical requirements remain to be solved. Specifically, methods that reliably produce materials which have both a high surface area and high degree of surface accessibility are limitations to the realization of materials with the desired characteristics for hydrogen storage applications. Moreover, it would be desirable to develop a material that induces multilayer adsorption of hydrogen. As a result, there is a need to further develop and explore new material structures and compositions for storing hydrogen.

BRIEF DESCRIPTION OF THE DRAWINGS

(FIG. 3B).

(FIG. 4B) in which the solid lines are merely a guide for the eye.

DETAILED DESCRIPTION

A. Overview

Figure 1:
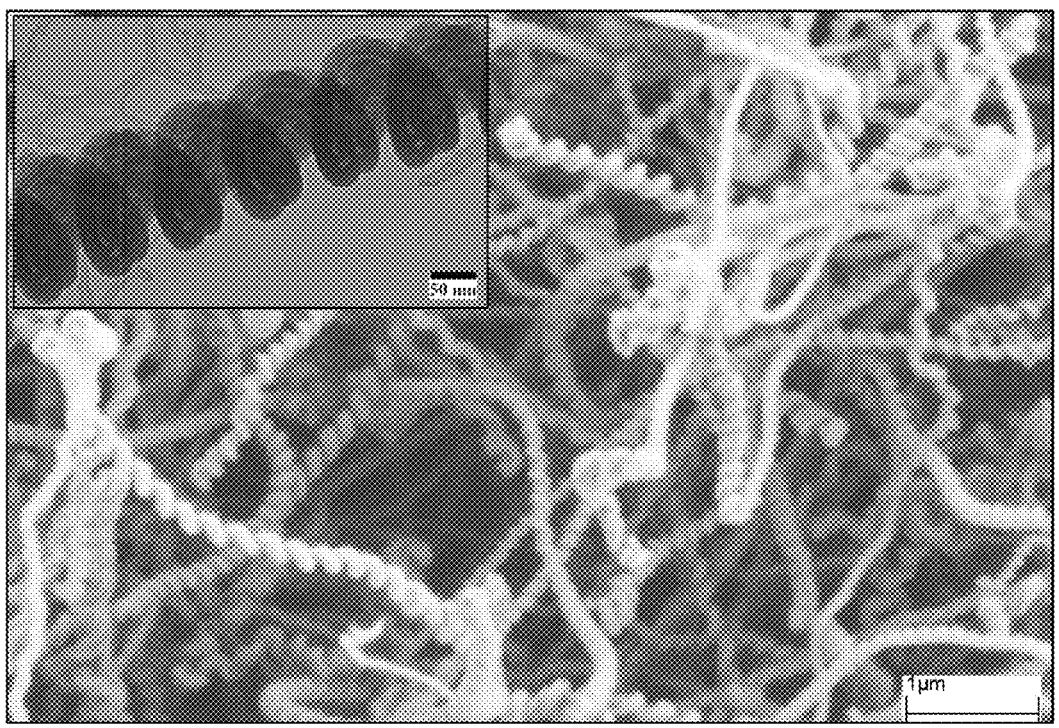
FIG. 1 is an SEM image of as-grown silica nanosprings in which the inset is a bright-field TEM image of an individual silica nanospring that shows an embodiment formed from multiple, intertwined nanowires.

In International Application No. PCT/US06/024435 the present inventors described methods to grow nanostructures onto the surface of substrate materials. The nanostructures formed by these methods can have several different compositions and be used in many different applications. Several embodiments of the present invention are directed to nanostructures composed of glass, ceramic and/or ceramic oxide materials to store or sequester hydrogen. The nanostructures can be formed on a substrate according to one or more of the methods disclosed in International Application No. PCT/US06/024435. In several embodiments, one aspect of the nanostructures is that they provide controlled, reversible multilayered hydrogen adsorption.

Several methods disclosed in International Application No. PCT/US06/024435 can be used to produce at least substantially continuous mats of nanostructures ('nanostructure mats') on substrate surfaces. The nanostructures can comprise either nanosprings and/or nanowires composed of glass (e.g., $SiO_2$), ceramic (e.g., SiC, BN, $B_4C$, $Si_4N_3$), or ceramic oxide (e.g., $Al_2O_3$, $B_2O_3$, $ZrO_2$) materials. Many embodiments of the nanostructure mats have high surface areas (~200 $m^2/g$) that are also highly accessible. The nanostructure mats may be formed on any suitable substrate surface capable of withstanding the conditions required for growing the nanostructures (e.g., temperatures of approximately 300-400° C. and the chemical properties of the precursors).

One embodiment utilizes nanostructure mats comprising silica glass ($SiO_2$) nanosprings with high surface areas and unique surface stoichiometry that provides nondissociative storage of hydrogen. As a result, multiple layers of hydrogen molecules adsorb at liquid nitrogen temperatures, and more importantly at normal ambient temperatures. Also, at least nearly complete desorption occurs at moderate temperatures (e.g., 100° C.), and partial or controlled desorption can be provided by controlling the temperature of the nanostructure mats at less than complete desorption temperatures. Moreover, the silica nanosprings can be formed at temperatures as low as 300° C. such that they can be grown on polymer substrates; this enables silica nanostructure mats to be formed in large-surface-area structures that enable practical storage of hydrogen.

B. Embodiments of Nanostructure Mats

Several embodiments of the nanostructure mats composed of glass, ceramic and/or ceramic oxide materials provide a viable approach for hydrogen storage applications. The contiguous or continuous mats of nanostructures can be grown on at least part of a substrate surface such that the nanostructures provide a high surface area that is also highly accessible. Both attributes are useful for molecular storage applications because the high accessibility allows for facile molecular diffusion through the medium and the high surface area provides sufficient real estate at which desirable surface-molecule interactions may occur.

For the purposes of hydrogen storage, as used herein, highly accessible is generally used to mean a structure with channels, gaps, openings and/or other spacing between the nanostructures within the nanostructure mat. Suitable spacing between nanostructures, for example, can be at least about 3 Å on average. In other applications, the interstitial spacing can be approximately 1-20 Å, and more specifically about 2-5 Å. As used herein, a high surface area generally means a surface with at least 10 $m^2$ of surface for every gram of material, and more specifically of 100 $m^2$-2,000 $m^2$ per gram of material, and still more specifically about 150 $m^2$-300 $m^2$ per gram (e.g., about 200 $m^2/g$).

FIG. 1 illustrates an embodiment of individual nanostructures comprising nanometer-scale wires or springs wherein each wire of spring is between about 1 nm and 1000 nm in diameter. In some cases nanostructures may be bundled together (e.g. coiled or twisted around one another). The length of any one nanostructure may vary greatly. The nanostructures are grown in a manner that generates surfaces with many nanostructures in close proximity resulting in the formation of a nanostructure mat. Within the nanostructure mat, individual nanostructures may or may not demonstrate an ordering. In most cases the nanostructures form a mat of interwoven nanostructures demonstrating a high degree of disorder.

The thickness, dimensions, surface coverage density, and other parameters of the nanostructure mats may all be varied for a particular implementation employing methodology disclosed in International Application No. PCT/US06/024435. In some implementations, only a portion of a substrate surface is coated with the nanostructure mat; this can be independently controlled during the process of forming the nanostructures.

Many different types of substrates and substrate structures can be used because the nanostructure mats may be grown on any surface capable of withstanding the conditions for growing the nanostructures. The synthesis conditions for forming the nanostructures are a function of the physical properties of the precursor materials, and thus potential substrate materials suitable for one particular nanostructure composition may not be suitable for another. The substrates can also have suitable shapes for hydrogen storage applications. Substrates with a large surface area on which nanostructure mats may be grown are generally desired. For example, honeycomb structured substrates, coils or coiled substrates, undulated substrates and/or substrates containing a variety of folds and bends are suitable. Alternatively, simple planar or other non-intricate substrate structures may also be used. As explained in detail below, one or more substrate structures coated at least in part by nanostructure mats can be contained in a gas tight container that can be controlled to continually regulate the gas pressure, composition and temperature within the container.

In several specific embodiments, the nanostructure mats comprise either nanosprings or nanowires composed of glass (e.g., $SiO_2$), ceramics (e.g., SiC, BN, $B_4C$, $Si_3N_4$), ceramic oxides (e.g., $Al_2O_3$, $B_2O_3$, $ZrO_2$), or compositions providing nanostructures wherein the chemical bonding within the nanostructure has a desirable ionic component. For example, the ionic character in the chemical bonding within the nanostructures preferably promotes non-disassociative hydrogen-nanostructure interactions. Generally covalent bonding interactions within a surface leads to weak local electric fields at the surface. In contrast to covalent bonding, ionic bonding produces larger electric fields near the surface of materials. In some cases, a large local electric field may induce a dipole moment within molecular hydrogen, thereby making a non-disassociative hydrogen-nanostructure interaction more favorable.

Several embodiments of the inventive nanostructure mats provide surfaces that enable more than one layer of hydrogen molecules to adsorb onto the nanostructures. More specifically, the present inventors have discovered that more than one layer of hydrogen adsorbs onto $SiO_2$ nanosprings or nanocoils. The present inventors, more specifically, believe that $SiO_2$ nanosprings have a unique ionization state that produces a surface which promotes bonding with hydrogen. As explained in more detail below, the curved or bent structures of nanosprings or nanocoils have an intermediate ionization state that is typically less than the standard $Si^{4+}$ ionization state for $SiO_2$ (e.g., $Si^{3+}$—$Si^{3.5+}$). This creates a sufficiently strong electrical field at the surface of the $SiO_2$ nanosprings to attract a first layer of hydrogen to the surface of the nanosprings and at least a portion of a second layer of hydrogen to the first layer of hydrogen. As one or more additional layers of hydrogen build on the first layer of hydrogen, the attraction force attenuates such that the outer surface of the hydrogen molecules tends to act more like a natural ionization state for $SiO_2$ (e.g., $Si^{4+}$). The $SiO_2$ nanosprings accordingly enable multilayered hydrogen formations on high density, high surface area nanostructure mats that effectively increase the density of hydrogen storage. Moreover, as explained in more detail below, the multilayered hydrogen formations can be created at normal ambient temperatures, and the hydrogen can be desorbed at controlled rates at temperatures less than 100° C. Therefore, it is expected that nanostructure mats formed from a plurality of $SiO_2$ nanosprings or nanocoils will provide significantly higher densities of hydrogen storage that can be dispensed at controlled rates in many transportation and other widespread applications.

More specifically, a nanostructure mat composed of $SiO_2$ nanosprings can provide a high surface area (~200 m$^2$/g) that has a high degree of accessibility. Assuming $H_2$ molecules are randomly and closely packed into a two-dimensional monolayer, a maximum theoretical gravimetric storage capacity of $H_2$ for monolayer adsorption on silica nanosprings is about 3.6% with a kinetic size of $H_2$ of d=0.289 nm. This value would correspond to a volumetric capacity of 58.2%. Because $SiO_2$ nanosprings are well suited for multilayer non-disassociative adsorption of hydrogen, they can provide an increase in this practical capacity.

The capacity to non-disassociatively adsorb multiple layers of hydrogen is demonstrated with reference to FIGS. 2-5.

Figure 2:
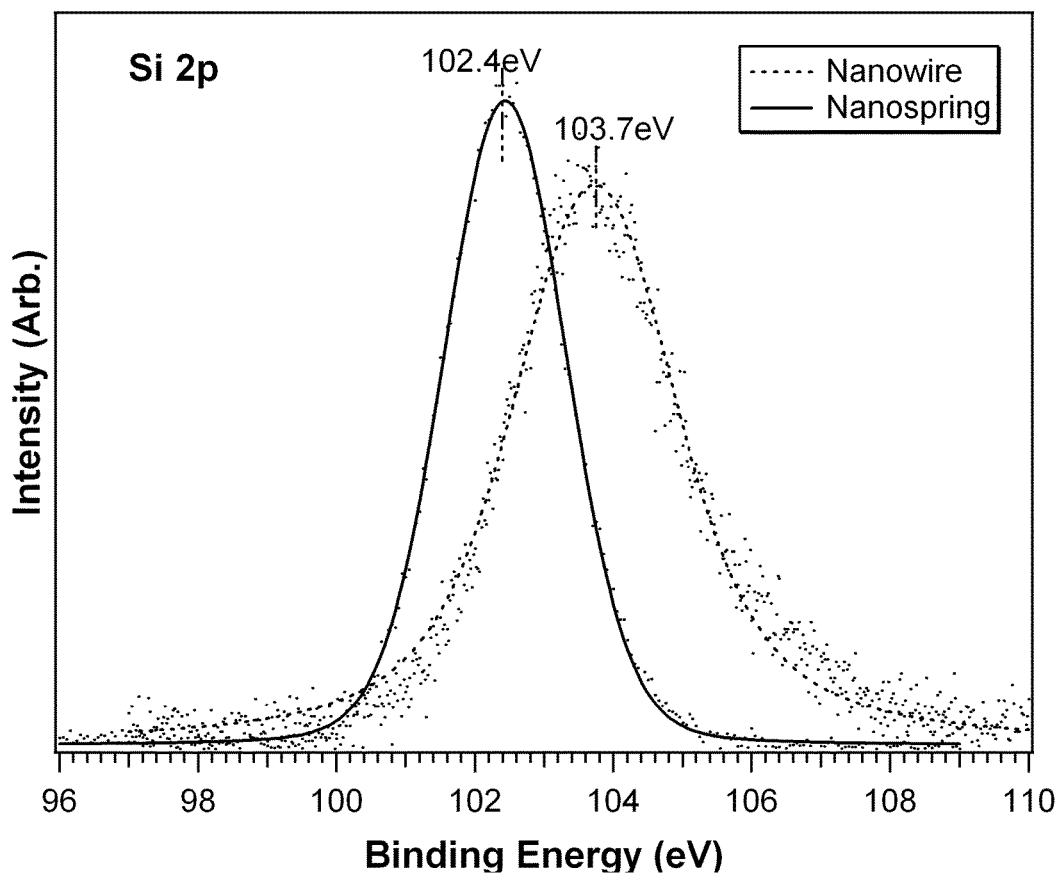
FIG. 2 is a graph showing XPS spectra of the Si 2p core level state of silica nanosprings (solid line) and silica nanowires (dashed line) in which the points are experimental data and lines are fits of experimental data.
Figure 3A:
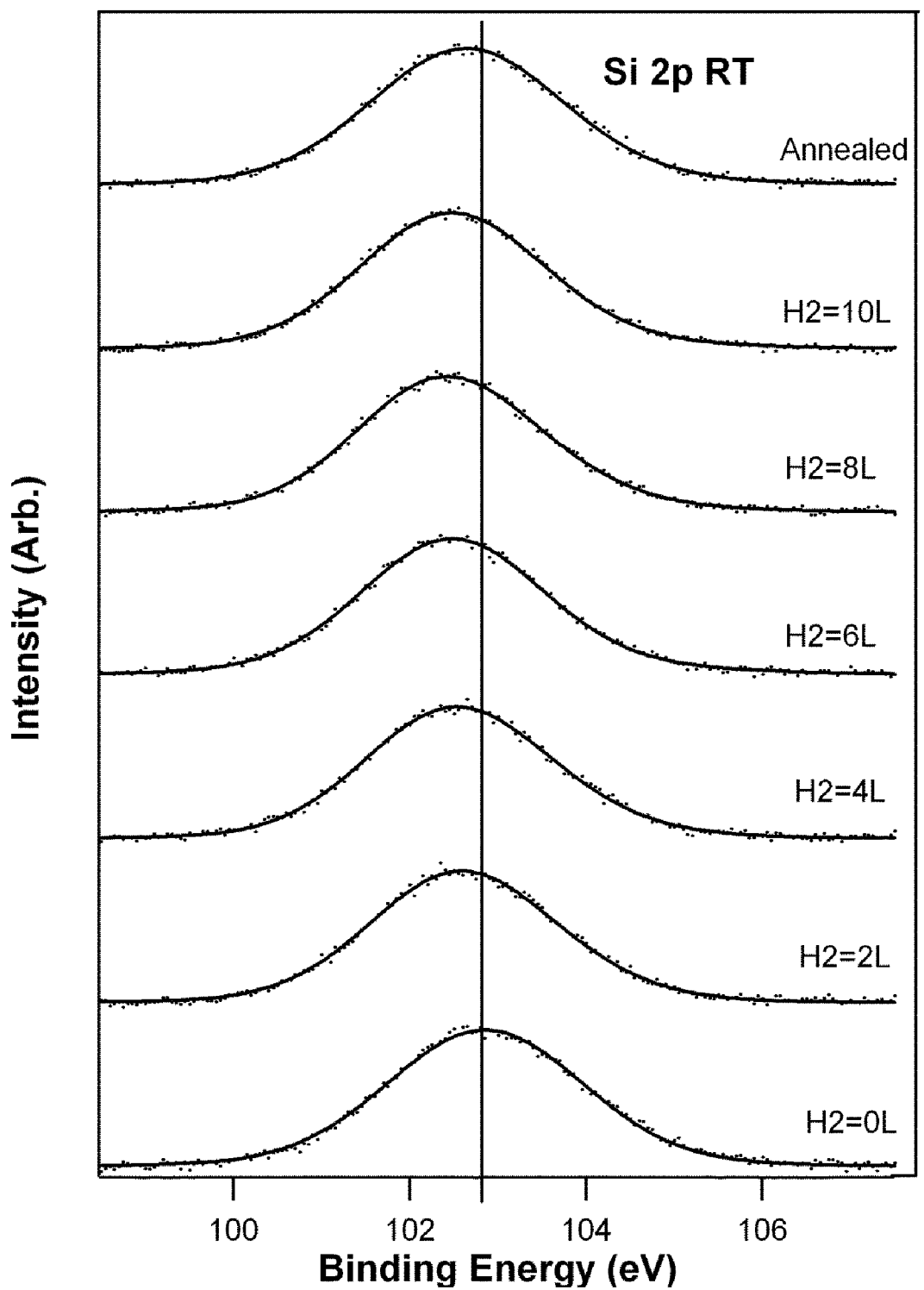
FIGS. 3A and 3B are graphs showing Si 2p XPS spectra of silica nanosprings as a function of $H_2$ exposure at room temperature (FIG. 3A) and 77° K.

FIG. 2 is a graph illustrating the binding energy of an $SiO_2$ nanowire compared to that of an $SiO_2$ nanospring. The X-ray photoelectron spectroscopy (XPS) shows that the binding energy of the Si 2p core level state of nanowires is at 103.70 eV, which is almost equivalent to $SiO_2$ and corresponds to an $Si^{4+}$ oxidation state. In contrast, the binding energy of the Si 2p core level of the nanosprings is 102.85 eV, which is indicative of an intermediate ionization state between $Si^{3+}$ (100.02 eV) and $Si^{4+}$. Relative to $SiO_2$ films and linear nanowires, the surface stoichiometry of the nanosprings results in a unique ionization state of the Si sites. This unique ionization state derives from the specific silicon-oxygen bonding interaction, and it promotes multilayered hydrogen adsorption via bonding. FIG. 3A is a series of plots showing the bonding energy at increased dosing steps performed at room temperature. FIG. 3A shows that $H_2$ adsorption shifts the Si 2p to lower binding energies, which is indicative of electron charge redistribution. Although the ionization state is still mixed, the shift moves toward the $Si^{3+}$ state which suggests that surface charge redistribution is to Si. Upon subsequent exposure to higher pressures of hydrogen, there is a shift back toward the $Si^{4+}$ state. These data clearly show that multilayered adsorption of hydrogen occurs with nanostructure mats of $SiO_2$ nanosprings. Moreover, materials of similar composition, such as ceramics (e.g., SiC, BN, $B_4C$, $Si_3N_4$) or ceramic oxides (e.g., $Al_2O_3$, $B_2O_3$, $ZrO_2$), are anticipated to demonstrate similar characteristics when subject to the appropriate geometric and electronic constraints.

In addition to providing multilayered adsorption, the hydrogen can be completely desorbed from the surface of the nanostructure springs by heating the substrate material to temperatures as low as 100° C. In several implementations, heating elements may be controlled to modulate the temperature of the substrate and thereby control the amount of hydrogen released from the nanostructures.

In one specific example, silica nanosprings were synthesized in a standard tubular furnace that is operated at temperatures as low as 325° C. and atmospheric pressure. The nanosprings were grown via the vapor-liquid-solid (VLS) mechanism, which was facilitated by the presence of gold nanoparticle catalysts. The nanosprings can be grown on a variety of substrates, including polyimides or other polymers. The only requirement is that the substrate can withstand the process temperature and chemicals. For example, in one application, the nanosprings were grown on single-crystal Si substrates to form a nanostructure mat having a surface area of approximately 200 m$^2$/g.

Figure 3B:
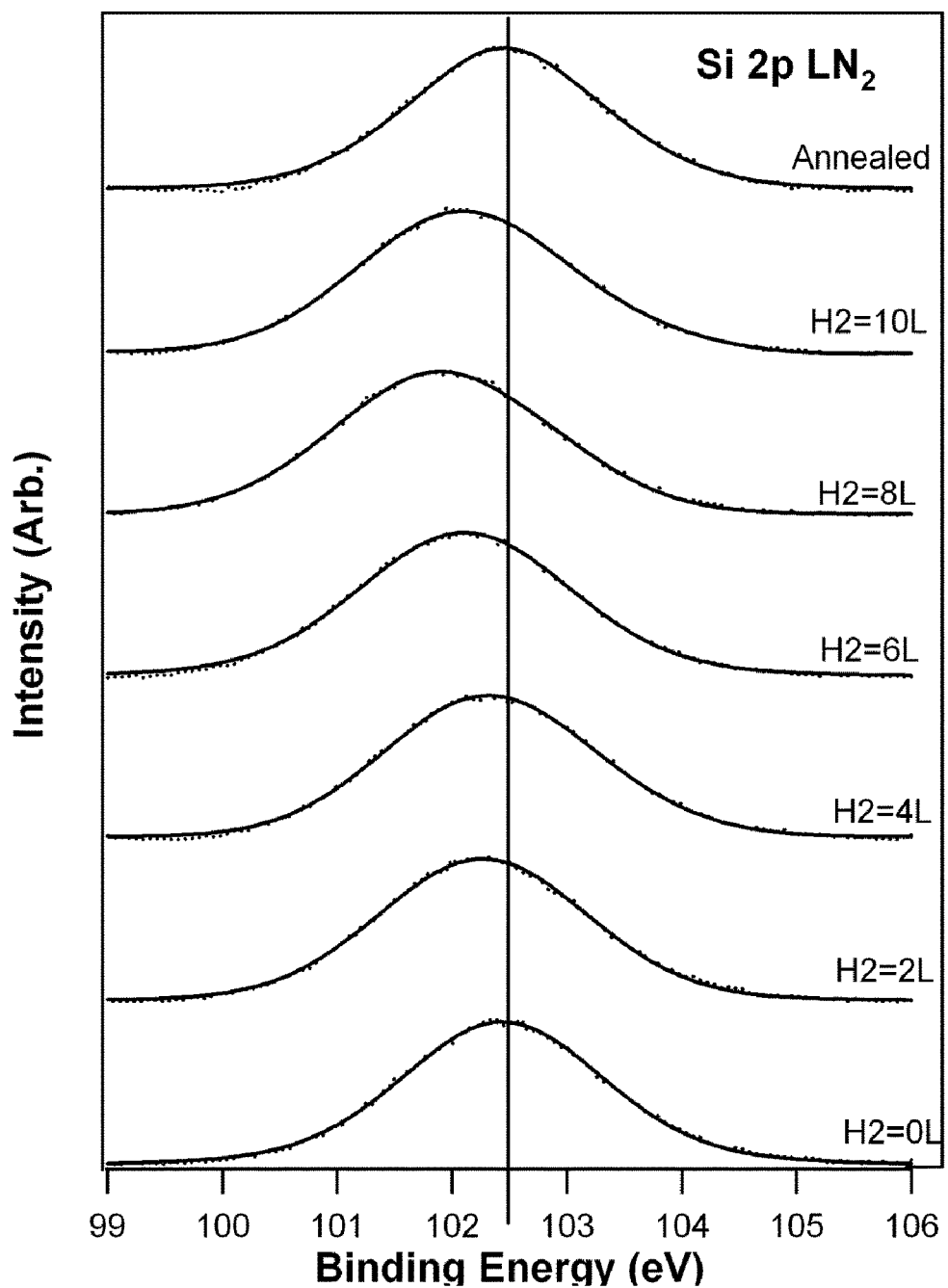

X-ray photoelectron spectroscopy (XPS) on the silica nanosprings was performed in conjunction with $H_2$ adsorption in order to determine whether $H_2$ adsorbs dissociatively or molecularly, and if so whether the process one of chemisorption or physisorption. Since hydrogen cannot be measured directly with XPS, the chemical shifts of the Si 2p and O 1s core levels were used to characterize the $H_2$ adsorption mechanism. The XPS data were acquired in a vacuum chamber, with a base pressure of $5 \times 10^{-10}$ torr, using the Mg Kα emission line (1253 eV) and a hemispherical energy analyzer with a resolution of 0.025 eV. During XPS acquisition the samples were bombarded by an electron flood gun to eliminate sample charging. The sample could be radiatively heated or cooled by liquid nitrogen in situ. The temperature was determined using a thermocouple in direct contact with the sample. Ultra high purity $H_2$ (99.9999%) was leaked into the vacuum chamber at a pressure of $1 \times 10^{-8}$ torr, where the exposure is given in units of Langmuirs (1 L=$10^{-6}$ torr-s). A series of $H_2$ adsorption studies were carried out at room temperature as shown in FIG. 3A and at liquid $N_2$ ($LN_2$) temperature (77° K.) as shown in FIG. 3B. XPS spectra were acquired at each temperature after each exposure to $H_2$. Adsorption sequences for the two temperatures were obtained from two different regions of the sample, with 2 L dosing steps in the first region and 5 L dosing steps in the second region.

The initial rationale for using silica nanosprings as a hydrogen storage medium was their large surface area, which is clearly demonstrated in FIG. 1. However, examination of the nanosprings with XPS also revealed that they have advantageous electronic properties relative to other forms of silica as described above with reference to FIG. 2.

The binding energy shifts of the Si 2p and O 1s core levels have been used as a qualitative measure of $H_2$ adsorption capacity, as well as to determine the adsorption sites, i.e., Si, O or both sites. Thermal stimulated desorption of $H_2$ from the surface of the nanosprings was used in conjunction with the core level shifts to determine if $H_2$ is chemi- or physisorbed onto the nanospring surface. As described above, FIG. 3A is a montage of the XPS spectra of the Si 2p core level as a function of room temperature exposures to $H_2$. The dots represent the experimental data and the solid lines are fits to the data using a Voigt function convoluted with a Lorenztian function. The binding energy of the Si 2p core level as a function of $H_2$ is plotted in FIG. 4A. The largest single shift of the Si 2p state occurs with the first exposure of 2 L $H_2$ (230 meV) and continues at a slower rate upon subsequent exposures until a maximum shift of 380 meV at 8 L $H_2$. The Si 2p core level shifts back to higher binding energies at 10 L of $H_2$, which indicates the completion of a monolayer and the formation of a second layer.

To determine if $H_2$ dissociatively adsorbs at room temperature, as well as to determine the desorption energy from the surface of the nanosprings, the sample exposed to 10 L $H_2$ was annealed at 373° K. The corresponding Si 2p core level spectrum is plotted at the top of FIG. 3A. After annealing, the Si 2p core level state shifts by 160 meV from 102.49 eV (10 L $H_2$) to 102.65 eV, but does not return to the initial value of 102.85 eV. This result suggests that the majority of the hydrogen desorbs, but residual amounts remain. Annealing at temperatures up to 673° K. did not remove all the remaining hydrogen, which would indicate that $H_2$ is initially dissociatively adsorped and that subsequent adsorption is molecular. Repeated cycling with 5 L dosing step (data shown in FIG. 4A with square symbols) between 10 L of $H_2$ exposure followed by annealing resulted in Si 2p core level shifts between 102.5 eV and 102.65 eV. The low desorption $H_2$ temperature of 373° K. is 500° K. lower than the reported desorption temperature of $H_2$ from single walled carbon nanotubes (SWCNT). This is particularly useful because it reduces the temperature requirements for desorption to levels that are suitable for transportation and consumer applications. Furthermore the full width at half maximum (FWHM) of the Si 2p core level spectrum upon annealing (hydrogen desorption) in FIG. 3A is effectively equivalent to that of the pristine nanosprings. For SWCNT the FWHM of the C 1s core level state upon annealing at 873° K. was significantly broader relative to pristine SWCNT, which suggests that molecular hydrogen dissociates to atomic hydrogen and a significant amount of atomic hydrogen remains attached to the surface. The results presented here for $H_2$ adsorption on silica nanosprings, and subsequent relatively low temperature desorption, indicate that silica nanosprings are a superior hydrogen storage media relative to SWCNT.

The preceding observations suggest that the $H_2$ adsorption rate is larger for initial exposures and decreases with subsequent exposures. The minimum binding energy of the Si 2p core occurs at an exposure of 8 L, and then shifts by 30 meV from 102.47 eV to a binding energy of 102.50 eV with two more Langmuirs exposure, for a total exposure of 10 L $H_2$. This result suggests that the completion of a monolayer of $H_2$ occurs with an expose of 8 L. Furthermore, the shift of the Si 2p core level to higher binding energies for exposures exceeding 8 L is indicative of the formation of a second monolayer of $H_2$. This conclusion is supported by studies of $H_2$ adsorption on porous Vycor glass, another form of high-purity $SiO_2$ glass, where it was found that the first monolayer was very strongly bonded to the glass surface, while the adsorption energy between the second monolayer and the first monolayer was relatively weaker. The results of our study of room temperature adsorption of $H_2$ on silica nanosprings predicts a gravimetric capacity exceeding 5% (assuming that only 2 monolayers form; additional adsorption would produce even greater storage capacities). In the present system, the second layer of $H_2$ adsorption produces a surface charge redistribution where the ionization state of the Si sites is shifted back towards that of the pristine surface, i.e., an increase of the binding energy of Si 2p core level for 10 L exposure of $H_2$.

Figure 4A:
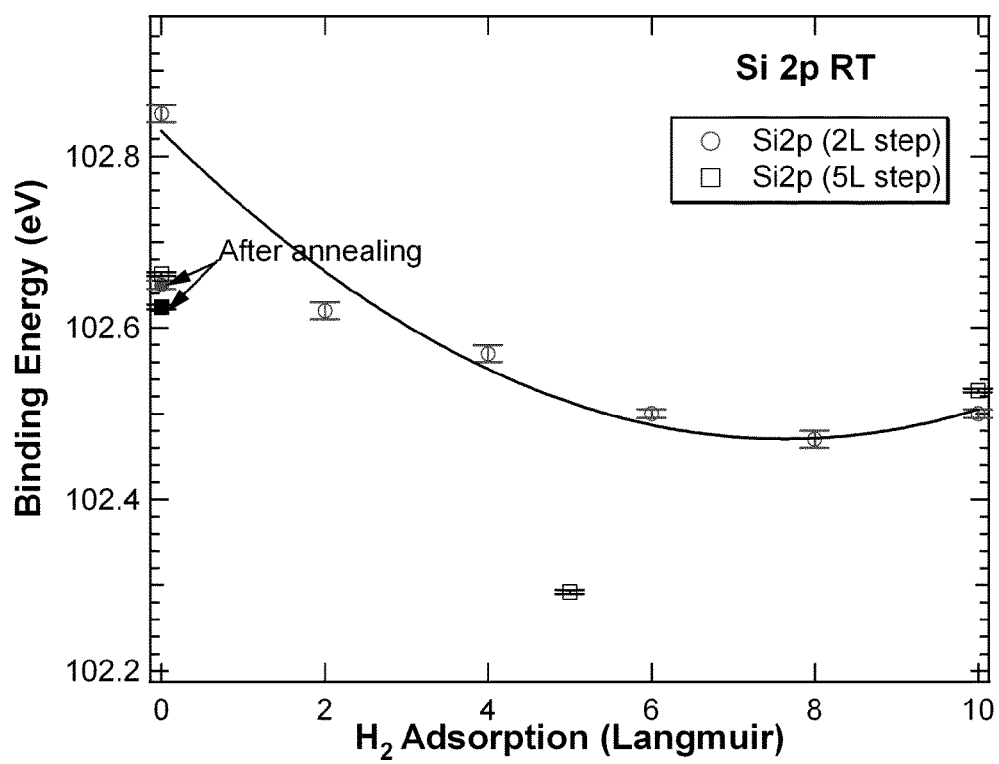
FIGS. 4A and 4B are graphs showing the binding energy of the Si 2p core level state as a function of $H_2$ adsorption at room temperature (FIG. 4A) and 77° K.
Figure 4B:
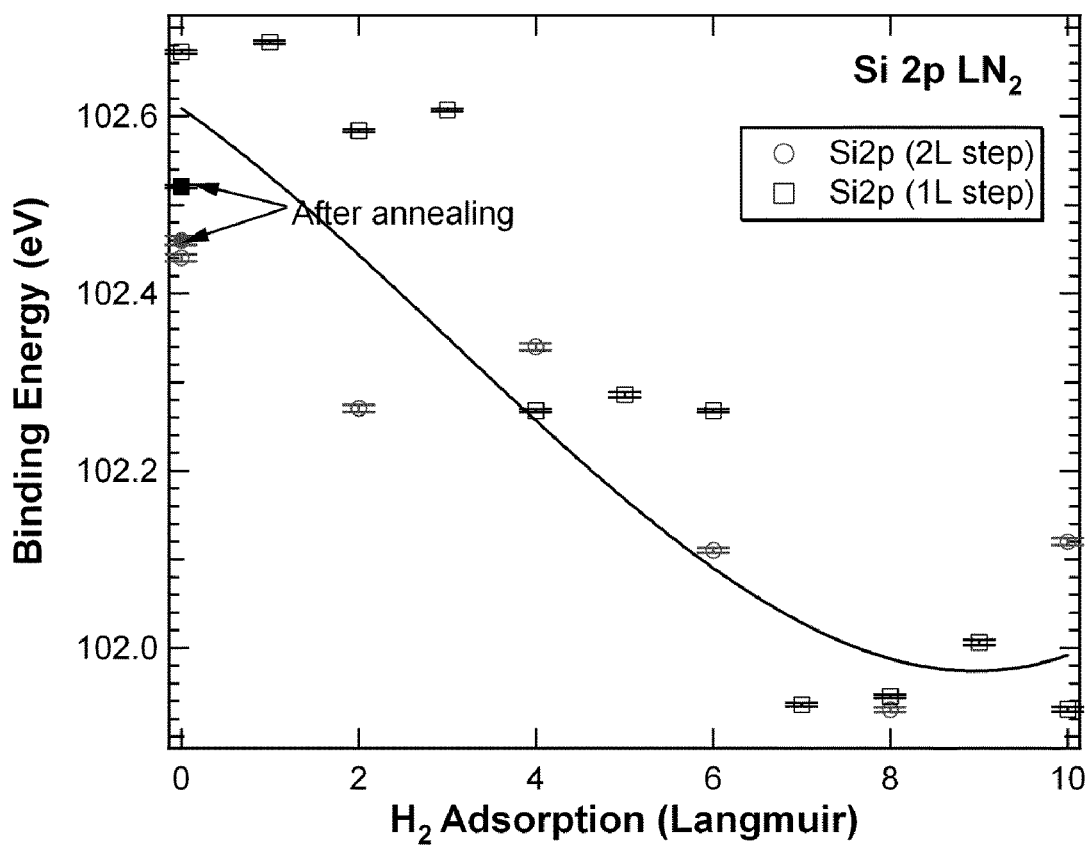

In order to demonstrate the temperature dependence of isobaric adsorption of $H_2$ onto the nanosprings, samples were cooled to 77° K. and $H_2$ adsorption experiments were conducted using the procedure used for room temperature adsorption. FIG. 3B is a graph showing plots of the XPS spectra of the Si 2p core level state as a function of $H_2$ exposure at 77° K. for different dosing. FIG. 4B is a plot of the Si 2p core level binding energy as a function of $H_2$ exposure doses of 1 L and 2 L. Comparing the data in FIGS. 4A and 4B, the shift of the Si 2p core level states with $H_2$ adsorption exhibit similar trends. However, for adsorption at $LN_2$ temperature the binding energy shift of the Si 2p is significantly larger. For example, at 8 L $H_2$ exposure the shift is 510 meV at $LN_2$ temperature, compared to 380 meV at room temperature, where 2 L dosing steps were used for both experiments. Physisorption is typically enhanced at lower temperatures due to decreased phonon-adsorbate interactions. With a subsequent $H_2$ exposure of 2 L, for a total of 10 L, the binding energy of Si 2p shifts back by 190 meV to a higher binding energy. A similar shift of 30 meV was observed at 10 L of $H_2$ at room temperature. Thus, a second monolayer of $H_2$ begins to form at room temperature and an $LN_2$ temperature, and the sticking coefficient for the second monolayer increases with decreasing temperature.

Figure 5:
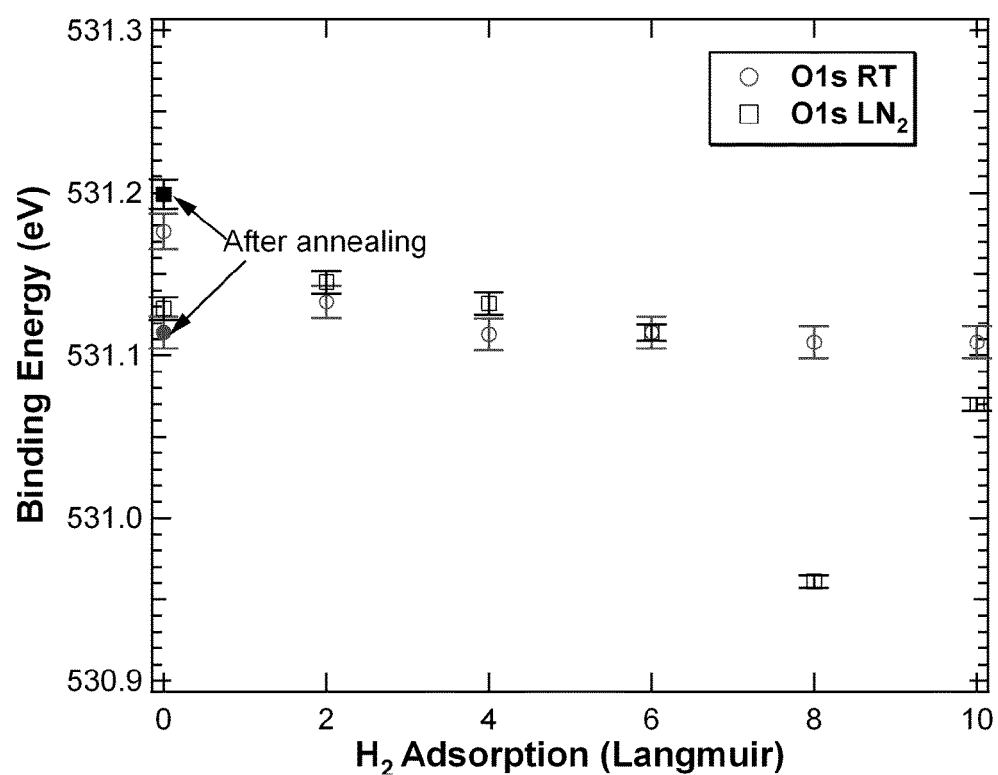
FIG. 5 is a graph showing the binding energy of the O 1s core level state as a function of $H_2$ adsorption at room temperature (○) and 77° K. (□).

The O 1s spectra are not shown for the sake of brevity, but core level shift of the O 1s as a function of room temperature $H_2$ exposure is plotted in FIG. 5. The average value of the binding energy of the O 1s as function of exposure is 530.99±0.01 eV. Other than an anomalous shift at 8 L, the O 1s core level state is unaffected by $H_2$ adsorption. This, in conjunction with the shift of the Si 2p core level state, suggests that charge redistribution is due to the interaction of the adsorbed $H_2$ with the Si surface sites. However, O surface sites cannot be precluded in redistribution of surface charge.

Referring still to FIG. 5, the behavior of the O 1s core level state as a function of $LN_2$ temperature adsorption of $H_2$ is equivalent to room temperature adsorption; as such, there is no obvious effect on the O1s binding energy. The average values are 530.99±0.01 eV for O1s under room temperature and 531.00±0.04 eV under liquid nitrogen temperature. These observations further indicate that hydrogen is primarily associated with the Si sites on the nanospring surface.

Thermal annealing of the nanosprings with 10 L of $H_2$ to 100° C. causes a shift of the Si 2 p core level state back to the original binding energy (102.5 eV) prior to $H_2$ exposure (FIG. 3B). Once again we can conclude that the adsorbed hydrogen molecularly desorbs. This desorption temperature is approximately 400 % higher than that of carbon (e.g., 80 ° K.). As a result, nanosprings provide a practical storage media for $H_2$ because the heat required for releasing $H_2$ can be obtained from the heat generated by the exhaust of a combustion engine and/or a heating element.

In conclusion, glass nanosprings offer a superior alternative to nanostructured forms of carbon for hydrogen storage both at room and liquid nitrogen temperatures. Multilayer physisorption of hydrogen on Si sites at the nanospring surface was verified by XPS. Our results indicate that gravimetric storage capacities of hydrogen exceed 5 % at room temperature and are even higher at 77 ° K. In addition, the low (100 ° C.) desorption temperature of $H_2$ from the surface of the nanosprings is superior to that reported for carbon nanotubes and favors quick release of stored hydrogen. Collectively, these observations lead to the conclusion that silica nanosprings, a unique form of nanostructured glass, are well suited for hydrogen storage.

C. Embodiments of Systems and Methods for Storing Hydrogen

Figures 6, 7:
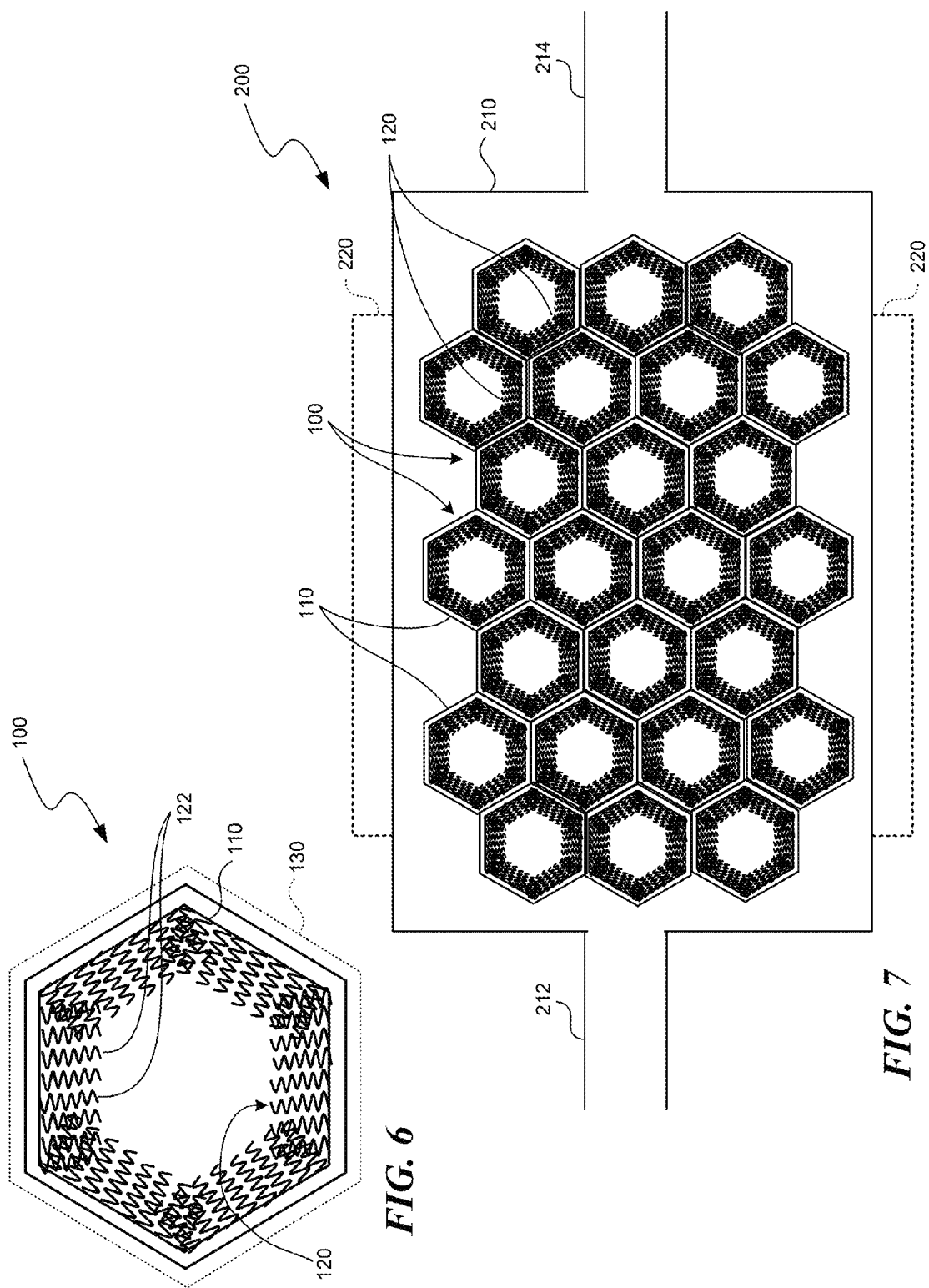
FIG. 6 is a schematic cross-sectional view of an apparatus with high surface area nanostructures for storing hydrogen in accordance with an embodiment of the invention.
FIG. 7 is a schematic cross-sectional view of a system having apparatus with high surface area nanostructures for storing hydrogen in accordance with an embodiment of the invention.

FIG. 6 is a schematic cross-sectional view of storage apparatus 100 for storing hydrogen in accordance with an embodiment of the invention. In this embodiment, the apparatus 100 has a substrate 110 with a hexagonal shape. The substrate 110 can be substantially planar or have other configurations in other embodiments (e.g., rectilinear, cylindrical, or other configurations). The apparatus further includes a nanostructure mat 120 having a plurality of individual nanostructures 122. As explained above, the nanostructures 122 can be nanosprings or other types of nanocoils composed of one or more materials that have a desired ionization state at the surface to promote multilayered adsorption of hydrogen onto the nanostructures 122. In specific embodiments, the nanostructures 122 are silicon oxide nanosprings, but the nanosprings can be composed of ceramics or ceramic oxides in other embodiments. The apparatus 100 can further include an activator 130 for imparting energy to the nanostructures 122 to desorb hydrogen from the nanostructure mat 120. In one embodiment, the activator 130 can be a heating element that heats the substrate 110 to a temperature at which hydrogen can be controllably desorbed from the nanostructure mat 122 for delivery to a device that uses the hydrogen as fuel. The activator 130, for example, can be an electrical heating element and/or a chamber through which heated gases pass over the outer surface of the substrate 110.

FIG. 7 is a schematic cross-sectional view of a storage system 200 having a container 210 with an inlet 212 and an outlet 214. The storage system 200 can further include a plurality of the storage apparatus 100 in the container 210. As shown in FIG. 7, the storage apparatus 100 can be arranged in a honeycomb configuration that provides a high density of nanostructure mats 120 within the container 210. The individual storage apparatus 100 in the container 210 can optionally include activators, such as the activator 130 shown in FIG. 6, to drive desorption of hydrogen molecules from within the container 210. The storage system 200 can optionally include one or more external activators 210 in addition to or instead of the optional activators 130 of the storage apparatus 100. The external activators 220 can be electrical heating elements, gas chambers for containing heated gases, or other suitable devices that impart a suitable energy modality to the hydrogen molecules on the surfaces of the nanostructure mats 120. In one specific example, the activators 220 can be gas chambers operably coupled to the exhaust of a combustion engine or air heated by the combustion engine to heat the external surface of the container 210.

The storage system 200 operates by injecting hydrogen into the container 210 through the inlet 212. To deliver gas from the container 210, the activators 130 and/or 200 can impart energy to desorb hydrogen from the nanostructure mats 120. The desorbed hydrogen can pass through the outlet 214 to a combustion engine, fuel cell, or other device that uses hydrogen for energy. In a typical application, the activators 130 and/or 200 control the temperature of the apparatus 100 to provide a desired desorption rate of hydrogen for delivery through the outlet 214. When the nanostructure mats 120 are composed of silicon oxide nanosprings, the activators 130 and/or 200 can heat the nanostructure mats 120 to a temperature less than 100 ° C. for sufficient desorption of the hydrogen.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

Appendix A

METHOD FOR MANUFACTURE AND COATING OF NANOSTRUCTURED COMPONENTS

STATEMENT REGARDING FEDERALLY SPONSORED RESEARCH OR DEVELOPMENT

The invention was funded in part by the National Science Foundation under Idaho EPSCoR grant EPS0132626. The United States government has certain rights in the invention.

BACKGROUND OF THE INVENTION

1. Field of the Invention

The present invention is directed generally to nanotechnology and, more particularly, to a type of surface modification and methods for the manufacture and coating of nanostructured components.

2. Description of the Related Art

One-dimensional nanostructures, including nanotubes, nanowires, nanorods, and nanosprings, have attracted considerable attention in the past decade due to their potential applications in fields such as biological and chemical sensors, optoelectronic devices, and drug delivery carriers. In terms of realizing nanotechnology based on the use of nanomaterials, the primary requirements are the ability to synthesize large quantities of nanomaterials with uniform properties and through a repeatable process. These requirements have been largely achieved for nanoparticles and to a lesser extent for nanowires. However, the same cannot be said for nanosprings. The first publication on the synthesis of boron carbide nanosprings reported a yield of less than 10% and similar yields were reported for $SiO_2$ and SiC nanosprings. McIlroy D, Zhang D and Kranov Y 2001 Appl. Phys. Lett. 79 1540 . Zhang H, Wang C and Wang L, 2003 Nano Lett. 3 577 . Zhang D, Alkhateeb A, Han H, Mahmood H and McIlroy 2003 Nano Lett. 3 983 . Consequently, the development of nanotechnology based on nanosprings is currently not viable. An additional problem confronting nanosprings, as well as nanowires, is the incompatibility of the majority of the synthesis processes with current semiconductor integrated circuit technologies. The majority of nanospring processes require growth temperatures in excess of 900 ° C. Because nanosprings grow via a modified vapor-liquid-solid (VLS) mechanism, which requires the use of a metal catalyst, the high synthesis temperature makes it difficult to confine the catalyst, (i.e., surface migration occurs). Wagner R and Ellis W 1964 Appl. Phys. Lett. 4 89 . McIlroy D, Alkhateeb A, Zhang D, Aston D, Marcy A and Norton M G 2004 J. *Phys.: Condens. Matter.* 16 R415.

After the nanowires or nanosprings have been synthesized, they have potential use in applications ranging from chemical sensors to biological research. Nanowires and nanosprings may be tailored to both specific and broad-ranging applications and can be used as templates for metal nanoparticles (NPs). One of the most prevalent drawbacks of current techniques used to produce metal NPs is the processing time. For example, the chemical reduction technique used by Fukuoka et al. requires the substrate material to be left in the reaction solution for 24 hours. A. Fukuoka, H. Araki, J. Kimura, Y. Sakamoto, T. Higuchi, N. Sugimoto, S. Inagaki & M. Ichikawa, 2004. J. Mater. Chem. 14, 752. The chemical reduction process used by Boudjahem et al. requires sixteen hours to prepare the NPs. Boudjahem A-G., S. Monteverdi, M. Mercy, D. Ghanbaja and M. M. Bettahar. Nickel Nanoparticles Supported on Silica of Low Surface Area: Hydrogen Chemisorption and TPD and Catalytic Properties. Catal. Lett. 84, 115 (2002) Even the PVD process reported by Zhang et al. still required a procedure time of almost one hour. Zhang Y., Q. Zhang, Y. Li, N. Wang and J. Zhu. Coating of Carbon Nanotubes with Tungsten by Physical Vapor Deposition. Solid State Commun. 115, 51 (2000) For the production of metal NPs to be economical a rapid growth technique must be used that can produce NPs with small sizes and a narrow particle size distribution on a range of substrate materials.

Therefore, it can be appreciated that there is a significant need for reliable techniques for manufacturing nanowires and nanosprings as well as a reliable, speedy, and cost-effective technique for producing metal nanoparticles. The present invention provides this, and other advantages as will be described in the following detailed description and accompanying figures.

BRIEF DESCRIPTION OF THE SEVERAL VIEWS OF THE DRAWING(S)

FIG. 1 is a scanning electron microscope (SEM) image of a mat of silicon oxide nanosprings.

FIG. 2 are SEM images of silica nanosprings using different deposition temperature (a) 300° C. (b) 650° C., (c) 1000° C., and (d) an expanded image of panel (c).

FIG. 3 illustrates X-ray photoelectron spectroscopy of a silica nanospring mat.

FIG. 4 illustrates visual appearances of an as-grown nanospring mats on Si wafer at (a) a glancing angle relative to the surface normal the supporting Si substrate and (b) along the surface normal.

FIG. 5 is a graph illustrating the reflectivity spectra of nanosprings grown on 15, 30, and 60 nm Au catalyst layer. The spectrum of $SiO_2$ film is included as a reference.

FIG. 6 is a SEM image of silica nanosprings grown with a 30 nm Au catalyst layer. The bright spots are the Au catalyst at the tips of the nanosprings. The inset is a magnification of the Au catalyst.

FIG. 7 are bright-field transmission electron microscope (TEM) images of two different types of silica nanosprings: (a) and (b) are conventional types of nanosprings consisting of a single nanowire, (c) and (d) are nanosprings formed from multiple nanowires.

FIG. 8 illustrates high magnification TEM images of nanosprings from panels (c) and (d) in FIG. 7.

FIG. 9 are SEM images of selective area growth of silica nanosprings with (a) low magnification (b) high magnification.

FIG. 10 illustrates X-ray photoelectron spectroscopy data as a function of hydrogen adsorption of the silicon 2p and 2s at room temperature and at low temperature (200° K).

FIG. 11 is a flowchart illustrating an overview of processes for the synthesis of nanostructured mats and subsequent metallization steps.

FIG. 12 are TEM images of Ni NPs: (a) on a 100 nm SiO2 NW, (inset) HRTEM image of Ni NP showing {111} lattice planes; (b) on a 70 nm SiO2 NW, (inset) diffraction pattern; (c) on 20-40nm $SiO_2$ $NW_S$; (d) histogram showing particle size distribution for Ni NPs.

FIG. 13 illustrates TEM images of Pt NPs: (a) on a 40 nm SiO2 NW, (inset) HRTEM image of Pt NP showing {111} lattice planes; (b) on a 70 nm $SiO_2$ NW, (inset) diffraction pattern; (c) on a 35 nm $SiO_2$NW; (d) histogram showing particle size distribution for Pt NPs.

FIG. 14 illustrates TEM images of Au NPs: (a) on a 30 nm $SiO_2$NW, (inset) diffraction pattern; (b) on a 100 nm $SiO_2$ NW; (c) on a 80 nm $SiO_2$ NW.

FIG. 15 illustrates Pressure and temperature effect on NP size: (a) NP diameter vs. pressure; (b) NP diameter vs. temperature. The points represent the average particle sizes and similar error bars apply to all data points.

FIG. 16 illustrates HRTEM images of Au NPs: (a) 8 nm diameter particle exhibiting multiple crystal domains, (inset) 2 nm single crystal particle; (b) 3 nm cuboctahedron with clearly resolved {111} lattice planes; (c) several NPs ranging in size from 5 -9 nm showing multiple crystal domains. The background contrast is from the carbon support film.

FIG. 17 illustrates current voltage (I-V) curves of Au nanoparticles coated GaN nanowires in vacuum and exposure to Ar, $N_2$ and methane.

FIG. 18 illustrates a SEM image of $SiO_2$ NWs produced by the flow furnace technique.

FIG. 19 illustrates a SEM image of $SiO_2$ nanosprings produced by the flow furnace technique.

DETAILED DESCRIPTION

A new nanostructured surface coating and methods for production thereof are described herein. A new chemical vapor deposition (CVD) method for synthesizing nanostructures onto a variety of substrates using a flow furnace technique is described herein. The synthesis temperature can be as low as 300° C., which is compatible with current integrated circuit technology, and provides for a wide range of substrate materials. Furthermore, we demonstrate that techniques can be employed to make patterned nanostructured mats. These nanostructured mats have very high surface areas (~500-1000 $m^2/g$). Collectively these developments in nanostructure synthesis open the door for their use in many emerging technologies, where a high surface area material may provide for enhanced functional attributes.

Traditional methods for the synthesis of nanosprings and nanowires (collectively referred to herein as "nanostructures") involve the pre-treatment of a surface with a catalytic material. Typically, this catalytic material is a metal or metal alloy deposited onto the substrate as droplets of nanometer scale diameters. These droplets are isolated from other droplets of catalyst on the substrate, and as a result demonstrate a reduced melting point relative to a bulk material of identical composition. Once the droplets are deposited onto the material the pre-treated substrate is heated in a chamber with precursor nanostructure materials to a temperature sufficient to generate a sustained vapor pressure of the precursor materials (typically >900° C.). The gaseous precursors diffuse into the liquid metal droplet until a critical concentration is reached, at which time the growth of the nanostructures begins.

The traditional methodology is limited in many respects. First, the nanostructures only grow where the metal droplet has been deposited and since the droplets are isolated from one another the result is a sparse distribution of nanostructures on the substrate surface. Second, this sparse distribution is also responsible for a low yield of nanostructured material (since the catalyst covers only small parts of the surface and the sustained vapor pressure of the precursor materials needs to fill the entire chamber much material is wasted). Third, the high temperature associated with generating a sufficient vapor pressure of the precursor material(s) limits the range of potential substrate materials. These attributes of the conventional methodology substantially limit the ability to utilize these nanostructures in practical applications.

The present invention comprises a method for the production of glass (e.g., $SiO_2$), ceramic (e.g., SiC, BN, $B_4C$, $Si_3N_4$) ceramic oxide (e.g., $Al_2O_3$, $ZrO_2$), elemental (e.g., Si, Al, C, Ge) or semiconductor (e.g., GaN, GaAs, InP, InN) nanospring and/or nanowire mats (collectively referred to herein as "nanostructures" and "nanostructure mats") wherein a substrate material pre-treated through the deposition of a thin film of catalytic material and subsequently heated in combination with gaseous, liquid and/or solid nanostructure precursor materials for a period of time then slowly cooled under a constant flow of gas to room temperature. A generalized overview of this process is provided in the flow chart of FIG. 11.

The deposition temperatures may be as low as 300° C. and, depending on the precursor materials, may range from 300° C.-1000° C. The thickness of the nanostructured mat may range from 1 μm to 100 μm. The growth time may range from 30-60 minutes depending on the desired mat thickness The process also allows for selective growth of the nanospring mat in a predetermined pattern. The process is inexpensive, 100% reproducible, and readily scalable.

The nanosprings are attached to the substrate and thus do not require a binder. As will be described in greater detail below, the nanostructures and nanostructure mats may undergo a further process to be coated with metallic, metal alloy or magnetic nanoparticles.

The nanospring mat exhibits excellent step coverage. That is, the nanospring mat can be deposited on a non-planar surface and will readily follow the surface contours. FIG. 1 is a scanning electron microscope (SEM) image of a mat of silicon oxide nanosprings. As seen in FIG. 1, the nanospring mat follows the surface contours of the substrate.

Any substrate material that is capable of withstanding the nanostructure growth conditions is contemplated by the invention. That is, the present techniques can use any substrate that has a melting point higher than the temperature required for nanostructure growth. Typically the substrate material will be judiciously chosen by the operator based upon the intended application for the nanostructure appended surface. Specific examples include, but are not limited to, glass, metal, metal alloys, organic polymers, ceramics and semiconductors. Moreover the substrate may not simply be a flat material it may contain topological features; folds, cavities and/or channels.

Specific implementations include pre-treating a substrate material through depositing a surface layer (thin film) of a catalytic coating (e.g., a metal or metal alloy including, but not limited to, Au, Ag, Fe, FeB, NiB, $Fe_3B$, $Ni_3Si$). The pre-treatment involves coating the substrate material with the catalytic material using a number of different techniques described below wherein the thickness and density of the catalytic coating can be controllably modulated. In contrast to traditional methods, a uniform distribution of catalyst can be deposited onto the surface which facilitates uniform growth of nanostructures on the surface of the substrate. Since the growth is substantially uniform about the surface, a mat, or contiguous field of nanostructures is formed (this contiguous field is referred to herein as a "nanostructured mat"). This process also allows for another level of control in that the thickness of the catalytic coating may be varied between 5 and 200 nm. The thickness of the catalytic thin film will modulate the properties (e.g., nanospring/nanowire density, thickness) of the resulting nanostructure mat.

As noted above, a number of potential techniques for surface pretreatment (thin film deposition) are available to one skilled in the art, including but not limited to, plating, chemical vapor deposition, plasma enhanced chemical vapor deposition, thermal evaporation, molecular beam epitaxy, electron beam evaporation, pulsed laser deposition, sputtering and reactive sputtering and various combinations thereof.

An additional particular advantage of utilizing a thin film of catalyst is that this method allows for masking or patterning of the substrate material prior to deposition of the catalytic thin film. This facilitates a patterning of the surface with a nanostructured mat. The nanostructurers will only grow where the catalyst has been deposited. Masking may be achieved by selectively covering the substrate with a removable material or substance that can be removed prior or subsequent to nanostructure synthesis. The surfaces may be patterned through a modification (chemical, photochemical or other) of the surface properties that prevent deposition of the catalytic material, thereby preventing nanostructure growth. Alternatively, patterning of the nanostructured mat may also be accomplished through lithographic methods applied subsequent to synthesis of the nanostructured mat. In specific implementations the masking may be removed subsequent to nanostructure growth.

Once the surface pre-treatment and thin film deposition have been completed the nanostructure precursor materials are introduced, in a gaseous form, to the material. The gaseous precursors diffuse into the liquid thin film and once a critical concentration is reached within the catalytic thin film nanostructure growth begins.

In traditional implementations the high temperatures were necessary to generate a sustained vapor pressure of the precursors. In the present implementation, molecular or elemental precursors that naturally exist as a gas or low boiling point materials are utilized. As a result, the only temperature restrictions relate to the temperature at which the thin film catalyst becomes a liquid, and the temperature at which a molecular precursor decomposes into its constituent components.

The introduction of the precursor materials may occur in sequence or in parallel, or may only involve one precursor. Additionally, dilution or concentration variations, and the duration of exposure to the introduced precursor materials can be utilized to modulate the properties (e.g., thickness) of the resultant nanostructured mat.

Many potential variations for the introduction of the precursor(s) exist, a brief description of some potential implementations are provided below.

Implementation 1.

This implementation comprises the heating of a gaseous or low boiling point molecular (examples include, but are not limited to $SiH_4$, $SiH(CH_3)_3$, $SiCl_4$, $Si(CH_3)_4$, $GeH_4$, $GeCl_4$, $SbH_3$, $Al(R)_3$ (R=hydrocarbon)) or elemental (e.g., C, Si, Ga, Hg, Rb, Cs, B, Al, Zr, In) nanostructure precursor in a chamber containing a pre-treated substrate material to a temperature sufficient to generate a sustained vapor pressure of the nanostructure precursor element and holding the temperature relatively constant throughout the nanostructure growth process.

Implementation 2.

This implementation comprises the heating of a solid elemental nanostructure (e.g., C, Si, Ga, B, Al, Zr, In) precursor in a chamber containing a pre-treated substrate material to a temperature sufficient to generate a sustained vapor pressure of the nanostructure precursor element and holding the temperature relatively constant while adding (through methods including, but not limited to introducing a flow, filling the chamber to a static pressure) the second nanostructure precursor in a gaseous molecular (e.g., $CO_2$, CO, NO, $NO_2$) or elemental form (e.g., $O_2$, $N_2$, $Cl_2$).

Implementation 3.

This implementation comprises the heating of a solid elemental nanostructure precursor (e.g., C, Si, Ga, B, Al, Zr, In) in a chamber containing a pre-treated substrate material to a temperature sufficient to generate a sustained vapor pressure of the nanostructure precursor element and holding the temperature relatively constant throughout the nanostructure growth process.

Implementation 4.

This implementation comprises the heating of a chamber containing a substrate material to a temperature of at least 100° C., wherein a molecular nanostructure precursor (examples include, but are not limited to $SiH_4$, $SiH(CH_3)_3$, $SiCl_4$, $Si(CH_3)_4$, $GeH_4$, $GeCl_4$, $SbH_3$, $Al(R)_3$ (R=hydrocarbon), $CO_2$, CO, NO, $NO_2$, $N_2$, $O_2$, $Cl_2$) is introduced through a gas flow to the chamber during the heating process and once the chamber has reached predetermined temperature a second molecular nanostructure precursor (examples include, but are not limited to $SiH_4$, $SiH(CH_3)_3$, $SiCl_4$, $Si(CH_3)_4$, $GeH_4$, $GeCl_4$, $SbH_3$, $Al(R)_3$ (R=hydrocarbon), $CO_2$, CO, NO, $NO_2$, $N_2$, $O_2$, $Cl_2$) is flowed through the chamber while the temperature is held constant.

The resulting nanostructured materials may be further modified through the deposition of metal or metal alloy nanoparticles onto the surfaces of the nanostructures. The nanoparticles attached to the nanostructure may be metallic with single or multiple types of metals, a metal alloy or magnetic nanoparticles. For the sake of convenience, these various components will be referred to herein as nanoparticles (NPs). The present invention is not limited to the particular examples of NPs described herein.

The NPs may be deposited through any number of means, including but not limited to chemical synthesis in solution (reduction of aqueous precursor), chemical vapor deposition and laser ablation. These NPs may be further modified by attachment of active chemical or biological compounds examples of the metallization process are described in greater detail below.

Nanostructures materials provide high surface area substrates, that have a broad range of applicability ranging from hydrogen storage (e.g., a $SiO_2$ nanospring mat) to optical (e.g., surface enhanced Raman response from a nanostructure coated with NPs appended with an environmentally responsive small molecules) or chemical (e.g. appending the metal particles with molecular recognition elements such as a DNA or RNA sequence, amino acid or other small molecule) sensors. The versatility in both form and function provided by the materials and methods described herein facilitates nanostructure utilization in many additional implementations. Exemplary uses include but are not limited to, hydrogen (or any other chemical) storage, catalytic processing (enzymatic or chemical), fuel cells, substrates for chemical separations, electronic sensing (semiconductor nanostructures), optical sensing, environmental monitoring, spacers or scaffolds for the production of microelectromechanical (MEM) devices.

A nanostructure gas sensor comprising: a nanomat structure; metal or metal alloy particles attached to the nanomat structure, metal particles having particle size and particle distribution on the nanomat structure; and a plurality of electrical contacts operatively coupled to the nanomat structure to permit changes in voltage or current between ones of the plurality of contacts in the presence of a gas. The sensor material is composed of Au particles on a GaN nanostructure.

A nanostructure optical sensor comprising: a nanomat structure; metal or metal alloy particles attached to the nanomat structure; molecular recognition elements appended to the surface of the metal particles. Upon exposure to the recognition target and optically detectable change occurs.

A nanostructure molecular sensor comprising: a nanomat structure; metal or metal alloy particles attached to the nanomat structure; molecular recognition elements appended to the surface of the metal particles. Upon exposure to the recognition target and detectable change occurs.

A nanostructure hydrogen storage device comprising: a $SiO_2$ nanostructure mat. The hydrogen molecules directly interact with the SiO2 nanostructures.

A nanostructure catalytic converter comprising: a $SiO_2$ nanostructure; and NiPt particles attached to the nanomat structure, the NiPt particles having a selected particle size and particle size distribution on the nanomat structure to provide bonding sites for catalysis.

A nanostructure catalytic converter comprising: a nanostructure; and metal particles attached to the nanomat structure wherein the metal particle cats to catalytically convert a target molecule.

A nanostructure catalytic converter comprising: nanostructure; and metal particles attached to the nanomat structure; and a molecular or enzymatic catalyst appended to the surface of the metal particle.

Specific implementations are provided herein as illustrations and are not intended to limit the scope of the invention as various modifications will become apparent to one skilled in the art.

EXAMPLE 1

Nanostructure growth

A: Surface Pre-Treatment

The catalyst is gold (Au) and is sputtered onto the support substrate in the thickness range 15-90nm. The sputtering chamber is operated at pressure of 60 mTorr, and the Au deposition rate is about 10 nm/min. During deposition a constant $O_2$ flow rate is maintained. The synthesis time is approximately 30 minutes. In order to demonstrate the lithography capabilities the substrate was masked prior to sputtering of the Au catalyst using tape, which was removed prior to nanospring synthesis. The patterns were lines approximately 500 µm wide.

B: Nanowire Growth (Implementation 2)

The GaN nanowires are grown in a flow furnace where a ceramic boat holds pellets of Ga. The furnace is raised to a temperature between 850° C. and 1050° C. During warm-up the system is purged with nitrogen gas.

Upon reaching temperature the nitrogen gas is shut down and ammonia is the introduced into the flow furnace. The flow rate is varied from 1-100 standard liters per minute (slm).

From this point on two approaches can be used. The first is that the system is maintained at this temperature and flow for 15-60 minutes. The second approach is to close of gas flow and exhaust (i.e., seal the furnace) with a static pressure, approximately atmospheric or higher, of ammonia for 15-30 minutes. In both cases, for cool down the ammonia is turned off and nitrogen gas is then flowed until room temperature is reached.

C: Nanospring Growth (Implementation 4)

The substrate is prepared with Au coating. The coating thickness can be 15 nm or higher. The substrate must be able to maintain a temperature higher than 350° C. The Au coated substrate is placed into a flow furnace and processing takes place from 350° C. to 1050° C., and higher if desired. During warm up a 1-100slm flow of trimethyl Silane is introduced into the flow furnace for 10seconds to three minutes and then turned off. Immediately after the trimethyl-Silane flow is turned off pure oxygen is flowed through the furnace at a rate of 1-100slm. The system is maintained at temperature and oxygen flow from 15 to 60 minutes.

The synthesis apparatus consists of a standard tubular flow furnace that is operated at atmospheric pressure. The general principles of this furnace are known in the art. An example of a suitable apparatus is discussed in detail in McIlroy D, Alkhateeb A, Zhang D, Aston D, Marcy A and Norton M G 2004 *J. Phys.: Condens. Matter* .16 R415. The furnace is operated in the temperature range of 100-1000° C. for silica nanospring synthesis.

EXAMPLE 2

Nanospring Characterization

The nanospring mats were characterized by scanning electron microscopy (SEM) using an AMRAY 1830 field emission scanning electron microscope (FESEM) at 15 kV and individual nanosprings by transmission electron microscopy (TEM) with a Philips CM200 transmission electron microscope (TEM) operated at 200 kV. The chemical composition of the nanosprings was determined by X-ray photoelectron spectroscopy (XPS). The XPS data was acquired in a vacuum chamber with a base pressure of $5 \times 10^{-10}$ Torr equipped with the Mg Kα emission line (1253 eV) and a hemispherical energy analyzer with an energy resolution of 0.025 eV. The XPS measurements were performed on nanosprings supported on a Si substrate. During the XPS measurements the nanospring sample was neutralized with a low energy (500 eV) beam of electrons in order to eliminate spurious charging of the sample. If electron neutralization of the nanosprings was not utilized, binding energy shifts of the core level states as large as 10 eV were observed. The optical reflectivity spectra of the silica nanospring mats were measured using a VASE model spectroscopic ellipsometer (J. A. Woollam Co., Inc) with a spectral range of 300-1750 nm.

Displayed in FIG. 2 are typical SEM images of nanospring mats grown at 300° C., 650° C. and 1000° C. with a gold catalyst layer of 30 nm. FIG. 2 demonstrates that nanosprings can be grown at a large range of temperatures with no observable changes in their geometries or sizes. FIG. 2(*d*) is a magnified image of FIG. 2(*c*), which illustrates the extremely uniform helical structure that the majority of the nanosprings exhibit. FIG. 3 is an XPS of a nanospring mat grown on a Si substrate. The O, C, and Si peaks have been labeled accordingly. The major peaks are Si and O, which are the main components of the as-grown nanosprings. It is worth noting that small ghost peaks are observed for all of the O, C and Si core level states. These ghost states are always at lower binding energies relative to the actual core level states and are artifacts attributed to the application of an electron flooding gun to neutralize the positive charge of the sample surface. The binding energy of the Si 2p core level is 100.5 eV, which is between the binding energy of $Si^0$ of unoxidized silicon (98.7 eV) and $Si^{4+}$ of $SiO_2$ (103.3 eV). Wagner C, NIST X-Ray Photoelectron Spectroscopy (XPS) Database. This indicates that the charge state of Si in the nanosprings is somewhere between 0 to +4. The O 1s core level has a binding energy of 530 eV, which is approximately 2 to 3 eV lower than that of $SiO_2$. Wagner C, NIST X-Ray Photoelectron Spectroscopy (XPS) Database. This suggests that a greater charge transfer from Si to O for the silica nanosprings, relative to $SiO_2$. The binding energy of C 1s is 281 eV, which is in the binding energy range of a carbide. Shen D, Chen D, Tang K, Qian Y and Zhang S 2003 *Chem. Phys. Lett.* 375 177. This indicates that the surface stoichiometry of the nanospring is $SiO_{2-x}C_x$, where x is determined by quantitative analysis of XPS results. The atomic concentration of each element is 43.2±1.3% for Si, 44.4±0.6for O, and 12.7±2.6% for C. The above values lead to a x value of 0.38±0.03. However, while the relative concentrations of O to Si remain constant, the relative concentration of C can vary within the sample and from sample to sample. This suggests that the C resides at the surface of the nanosprings, as opposed to subsurface. The carbon could originate from the environment or the Si precursor that contains some carbon sources.

Displayed in FIG. 4 are photographs of an as grown nanospring mat on a silicon substrate at (a) a glancing angle relative to the surface normal the substrate and (b) along the surface normal. At glancing angles (FIG. 4(*a*)) the mat looks diffuse with a reddish-orange tint. When viewed along the surface normal (FIG. 4(*b*)) the mat is translucent. The reflection in FIG. 4(*b*) is that of the overhead fluorescent lights. This visual behavior is consistently observed for all samples.

The reflectivity spectra of nanospring mats for gold catalyst thicknesses of 15, 30 and 60 nm are displayed in FIG. 5. The Au surface plasmon is observed at 540 nm for the 60 nm Au catalyst layer. It is the absorption of the Au surface plasmon that gives the nanospring mats the reddish-orange tint described above with respect to FIG. 4. Shen D, Chen D, Tang K, Qian Y and Zhang S 2003 *Chem. Phys. Lett.* 375 177. The effect of decreasing the thickness of the Au catalyst layer is a flattening of the plasmon absorption line and a slight shift to shorter wavelengths. The overall color of the mat goes from reddish-orange for a 60 nm catalyst layer to reddish for a 30 nm catalyst layer to purplish for a 15 nm catalyst layer.

Examination of the size of the Au catalyst at the tips of the nanosprings indicates that the average Au nanoparticle size decreases with decreasing catalyst layer. A typical SEM image of silica nanospring mats grown with a 30 nm Au catalyst layer is displayed in FIG. 6. The bright spots are the Au catalysts at the ends of the nanosprings. This image and others demonstrate that the silica nanosprings grow via the VLS mechanism. The SEM micrographs have been used determine the average catalyst size. It is important to note that the shapes of the catalysts are asymmetric (see inset in FIG. 6). For the 60 nm catalyst layer the average dimensions of the catalysts are 200 nm (±38 nm) by 135 nm (±27 nm), with an asymmetry of 1.47:1 . For the 30 nm catalyst layer the average dimensions of the catalysts are 117 nm (±15 nm) by 81 nm (±18 nm), with an asymmetry of 1.44:1. For the 15 nm catalyst layer the average dimensions of the catalysts are 90 nm (±10 nm) by 51 nm (±14 nm), with an asymmetry of 1.76:1. The average decrease in the catalyst size is consistent with the change in the color of the nanospring mats (i.e., a shift to shorter wavelengths of the Au plasmon with decreasing catalyst size). Dalacu D and Martinu L 2000 *J. Appl. Phys.* 87

228. Dalacu D and Martinu L 2000 *Appl. Phys. Lett.* 77 4283. A thinner Au catalyst layer results in thinner nanospring mats, which in turn leads to smaller catalyst particles and finally to smaller diameter nanowires forming the nanosprings.

Thus, the density of nanostructures on the substrate is modulated by the thickness of the thin film catalyst layer deposited on the substrate prior to growth of the nanostructures. If the catalyst layer is thick, the nanostructures are very densely packed with the nanostructures growing in bundles of intertwined springs where the distance between the individual nanostructures is approximately 0 nm. At the other extreme, the thin file catalyst layer could be very thin, resulting in nanostructures that are virtually isolated from each other. Nanostructure spacing could be as great as 5 µm in this example embodiment.

The length of the nanostructures can also be varied. In example embodiments, the nanostructures range from approximately 1 nm to 10 µm.

Transmission electron microscopy has revealed that two types of nanosprings are formed in this process. The first type of silica nanosprings are formed from a single nanowire, similar to reports on BC and SiC nanosprings. McIlroy D, Zhang D and Kranov Y 2001 *Appl. Phys. Lett.* 79 1540. Zhang H, Wang C and Wang L, 2003 Nano Lett. 3 577. Zhang D, Alkhateeb A, Han H, Mahmood H and McIlroy 2003 *Nano Lett.* 3 983. The second type of silica nanosprings are formed from multiple, intertwined, nanowires. Examples of the two types of nanosprings are displayed in FIG. 7. In FIGS. 7(*a*) and 7(*b*) are the conventional types of nanosprings consisting of a single nanowire, where the nanowires diameters are 72 nm and 50 nm and their pitches are 82 nm and 54 nm, respectively. The nanosprings formed from multiple nanowires are displayed in FIGS. 7(*c*) and 7(*d*). The nanospring shown in FIG. 7(*c*) is formed from approximately 5 nanowires with an average diameter of 18 nm, where the diameter of the nanospring is 182 nm with a pitch of 136 nm. The nanospring in FIG. 7(*d*) is formed from approximately 8 nanowires with an average diameter of 25 nm, where the diameter of the nanospring is 153 nm with a pitch of 218 nm. Similar phenomena have been observed for Ge nanowires using Au nanoparticles as catalysts Okamoto H and Massalski T, 1983 *Bull. Alloy Phase Diagrams* 4 2. The multi-nanowire nanosprings are considerably larger in diameter and pitch than nanosprings formed from a single nanowire. However, the diameters of the nanowires that form the multi-nanowire nanosprings are two to three times smaller. For both types of nanosprings the nanowires forming the nanosprings are amorphous, consistent with earlier reports of nanospring formation McIlroy D, Zhang D and Kranov Y 2001 *AppL Phys. Lett.* 79 1540. Zhang H, Wang C and Wang L, 2003 *Nano Lett.* 3 577. Zhang D, Alkhateeb A, Han H, Mahmood H and McIlroy 2003 *Nano Lett.* 3 983. McIlroy D, Alkhateeb A, Zhang D, Aston D, Marcy A and Norton M G 2004 *J. Phys.: Condens. Matter.* 16 R415.

In all cases of helical growth, such as carbon nanotubes or nanosprings, a mechanism must exist that introduces an asymmetry to the growth mechanism. In the case of nanosprings formed from a single amorphous nanowire, it is the existence of contact angle anisotropy (CAA) at the interface between the nanowire and the catalyst that introduces the asymmetry. McIlroy D, Zhang D and Kranov Y 2001 *Appl. Phys. Lett.* 79 McIlroy D, Alkhateeb A, Zhang D, Aston D, Marcy A and Norton M G 2004 J. Phys.: Condens. Matter. 16 R415. 1540. For the multi-nanowire nanosprings in FIGS. 7(*c*) and 7(*d*) CAA cannot be the mechanism driving asymmetric growth. An alternative model of multi-nanowire nanospring formation must take into account that the nanowires interact indirectly to form a collective behavior. It is therefore proposed that the mechanism behind the asymmetry is a competition between the nanowires forming the multi-nanowire nanosprings. It should be noted that because the nanowires forming the nanospring effectively grow independently, the interaction between them must be mediated through the catalyst. Effectively, the individual nanowires are in competition with one another for Si and O contained within the catalyst. As a consequence of this competition, some nanowires will have higher growth rates relative to other nanowires within the nanospring. The differences in growth rates between the nanowires of the nanospring produce torques on the catalyst which in turn produces the helical trajectory. Furthermore, the competition may not always produce coherent interactions that produce well formed multi-nanowire nanosprings of the type in FIG. 7(*c*).

Displayed in FIG. 8 are magnified images of FIGS. 7(*c*) and 7(*d*), which illustrates the different degrees of coherence between the nanowires forming the nanosprings. The nanospring shown in FIG. 8(*a*) is an example of what will be referred to as a coherent multi-nanowire nanospring. The nanowires in this nanospring maintain a high degree of coherence, where the nanowires track one another as opposed to intertwining. The ratio of nanospring diameter to pitch is 1.34. From examination of the nanospring in FIG. 8(*b*) it can be seen the nanowires are intertwined semi-coherently and it is postulated that the lack of well defined coherence results in a smaller ratio of the nanospring diameter to pitch relative to coherent nanosprings. For the nanospring in FIG. 8(*b*) this ratio is 0.70. It is suspected that in order to maintain a high level of coherence the diameter and pitch will be larger relative to the semi-incoherent nanosprings.

At this time there is no definitive explanation as to why multiple nanowires form from a single catalyst. One possible explanation is that at low formation temperatures (300-600° C.) the Au catalyst is not in the liquid state, but remains solid and therefore faceted, where individual nanowires form on respective facets. If it is assumed that during growth the catalyst is essentially an alloy of Au and Si, then nanowire growth below the eutectic temperature (363° C.) will occur when the catalyst will indeed by solid. Okamoto H and Massalski T, 1983 *Bull. Alloy Phase Diagrams* 4 2. Since the Au catalyst is deposited as film onto the substrate it is difficult to rationalize a mechanism whereby the adhesion of the Au catalyst and the substrate is broken without the catalyst being in the liquid state. The faceting of the Au particles at the tips of the nanosprings observed in FIG. 6 cannot be considered evidence of the catalyst being in the solid phase during nanospring formation since recrystallization could have occurred once the system returned to room temperature.

EXAMPLE 3

Surface Patterning

Displayed in FIG. 9 are SEM images of patterning of nanospring mats. FIG. 9(*a*) is of an approximately 500 µm wide line of a mat of nanosprings, Other than the placement of the Au catalyst (60 nm) using a shadow mask, no additional steps were required prior to insertion of the patterned substrate into the flow furnace. The rough edges reflect the edge of the adhesive tape used as the shadow mask. The deposition is confined to the area seeded with Au. A magnified SEM image of the edge of the nanospring mat is displayed in FIG. 9(*b*). The root mean square (rms) roughness of the edge is on the order of 15 µm, which is likely a combination of the rms roughness of the tape and the bleeding of the pattern due to the lateral growth of nanosprings. This initial test has demonstrated that the simplest lithography techniques can be utilized to pattern nanosprings mats. Because of the low processing temperatures that can be achieved with this process (~300° C.), minimal bleeding of the catalyst will occur, thereby allowing for greater control for select area growth. The next phase of lithography experiments will utilize formal lithography masks for catalyst patterning in order to determine the smallest feature sizes obtainable as a function of catalyst thickness. The information gleaned from these studies will help to define the geometric specifications of devices that can be constructed with mats of nanosprings, which in turn, will provide a measure of the potential impact of this process on emerging nanotechnology.

EXAMPLE 4

Hydrogen Interaction

X-ray photoelectron spectroscopy data as a function of hydrogen adsorption of the silicon 2p and 2s at room temperature and at low temperature are given in FIG. 10. The chemical shift with increasing exposure to $H_2$ indicates that the bond to the nanosprings is to the Si sites on the surface and is physisorption, as opposed to chemisorption.

Multiple implementations for the synthesis of nanostructures has been described above. In addition, different examples of the applications of such nanostructures have been described. One of the most important areas for metal NPs is in catalysis because of their increased surface area compared to traditional thin film materials, which results in more reaction sites. Two metals that have been studied for this particular application are nickel (Ni) and platinum (Pt). Platinum NPs have potential use in the oxidation of hydrocarbons, carbon monoxide, and methanol. Nickel NPs are typically utilized in benzene hydrogenation (Boudjahem et al., 2002), ketone and aldehyde reduction, and the decomposition of hydrazine.

Controlling the particle size is necessary for many catalysts to enable large surface areas and to produce an optimal size for catalyzing a particular reaction. Maximum catalytic activity is a function of particle size. Haruta, M. Size- and Support-Dependency in the Catalysis of Gold. *Catal. Today.* 36, 153 (1997). For example, the oxidation of carbon monoxide (CO) by gold (Au) NPs supported by alkaline earth metal hydroxides requires particles <2.0 nanometers (nm) in diameter. Photocatalytic hydrogen production using Au NPs supported on $TiO_2$ is most efficient when particle diameters are approximately 5.0 nm. Consequently, it becomes very important to be able to predict, control, and produce NPs of a desired size. Tailoring NP size with a selected substrate material will provide maximum efficiency for a catalyst system.

The majority of pollution emitted from automobiles is generated in the first five minutes that the engine is running and is a direct result of the inactivity of the current Pt- or Pd-based catalysts below 473 K. Campbell, CT. The Active Site in Nanoparticle Gold Catalysis. *Science* 306, 234 (2004). A possible solution to the limitations presented by existing catalyst materials is the use of Au-based catalysts. In its bulk form gold is very unreactive. However, when the diameter of gold particles is <10.0 nm the activity and selectivity become very structurally sensitive, making Au nanoparticles (NPs) useful in many catalytic reactions. Haruta, M. Size- and support-dependency in the catalysis of gold. Catal. *Today.* 36, 153 (1997).

It has been shown that different substrates are needed for effective catalysis using Au NPs. For example, complete oxidation of $CH_4$ is most effective when $Co_3O_4$ is used as the support (Haruta 1997). For the decomposition of dioxin, $Fe_2O_3$ is preferred as the support material (Haruta 2003). A technique that is capable of producing NPs on different substrates in a single system setup would be an efficient and economical method for producing catalytic materials.

As a consequence of the increased interest in Au NPs numerous techniques have been investigated for their production. Table 1 summarizes the majority of techniques that have been reported to produce Au NPs. In some of the approaches Au NP have been evenly distributed over specific types of nanostructures, while others produced depositions on planar substrates. There is a large variation in deposition quality among techniques and only a limited number of systematic studies have been presented to offer a means of tuning the particle size. Hostetler, M. J., J. E. Wingate, C-J Zhong, J. E. Harris, R. W. Vachet, M. R. Clark, J. D. Londono, S. J. Green, J. J. Stokes, G. D. Wignall, G. L Glish, M. D. Porter, N. D. Evans, and R. W. Murray. Alkanethiolate gold cluster molecules with core diameters from 1.5 to 5.2 nm: Core and monolayer properties as a function of core size. *Langmuir* 14, 17 (1998). Compagnini, G., A. A. Scalisi, O. Puglisi, and C. Spinella. Synthesis of gold colloids by laser ablation in thiol-alkane solutions. *J. Mater. Res.* 19, 2795 (2004).

| Technique | Particle Size (nm) | Ref. |
|---|---|---|
| Deposition - precipitation | 1-7 | Satishkumar et al 1996 |
| | 10 | Jiang and Gao 2003 |
| | 1 | Panigrahi et al 2004 |
| | 4 | Taubert et al 2003 |
| | 2-7 | Schimpf et al 2002 |
| Molecular Assembly | 2-5 | Han et al 2004 |
| | 12 | Wang et al 1998 |
| | 1-5 | Gutierrez-Wing et al 1998 |
| Sonochemical | 5 | Pol et al 2003 |
| Electrodless plating | 3-4 | Ma et al 2005 |
| Ion implantation | 5-10 | Guczi et al 2003 |
| Direct anodic exchange | 1-20 | Ivanova et al 2004 |
| Aerosol | 20 | Magnusson et al 1999 |
| CVD | 2-7 | Okumura et al 1998 |

Table 1. Summary of Various Techniques Used to Produce Gold NPs As will be described below, the metallization techniques described herein provides relatively uniform distribution of metal particles on the nanostructure and allows for the control of particle diameter. Metallization of nanostructures involves the forming of metal nanoparticles on the surface on nanowires. Although the nanowires may be synthesized by the techniques described above, those skilled in the art will appreciate that the metallization process described herein may be applicable to any nanostructure, whether or not synthesized by the techniques described herein. For example, SiC NWs were produced by plasma-enhanced chemical vapor deposition (PECVP) by techniques known in the art. Zhang, D., D. N. Mcllroy, Y. Geng, and M. G. Norton. Growth and characterization of Boron Carbide Nanowires. *J. Mater. Sci. Letters* 18, 349 (1999). Mcllroy, D. N., D. Zhang, R. M. Cohen, J. Wharton, Y. Geng, M. G. Norton, G. De Stasio, B. Gilbert, L. Perfetti, J. H. Streiff, B. Broocks, and J. L. McHale. Electronic and dynamic studies of boron carbide nanowires. *Phys. Rev.* B 60, 4874 (1999). The SiC NWs were grown on a Si substrate and have diameters ranging in size from 40-140 nm. The $SiO_2$ and GaN NW substrates were produced by a flow furnace technique using a known apparatus. Zhang, H-F., C-M. Wang, E. C. Buck, and L-S. Wang. Synthesis, characterization, and manipulation of helical $SiO_2$ nanosprings. *Nano Lett.* 3, 577 (2003). The NW produced therein were grown on a single crystal Si substrate and have diameters ranging in size from 30-180 nm. Thus, the metallization process described herein is applicable to a NW produced by traditional techniques or by the catalytic coating process described herein.

The metalized NPs are produced in a parallel plate PECVD chamber operated at 13.56 MHz. The chamber volume is approximately 1 $m^3$. The parallel plates are 3" in diameter and 1.5" apart. A nozzle protrudes from the center of the anode where the precursor/carrier gas mixture is introduced and the sample holder/heater serves as the ground plate. Argon gas was used as both the carrier and the background gas. The nanowire samples were mounted on a heated sample holder. The precursor compound was delivered to the deposition chamber by heating to 343° K in an argon stream. The substrates were heated to temperatures up to 873° K. The chamber pressure could be varied and the range explored was 17 to 67 Pa.

The following precursor compounds were used (obtained from Strem Chemicals, Inc):

Nickel: (bis(cyclopentadienyl)nickel [Ni-$(C_5H_5)_2$])
Platinum: (trimethyl)methylcyclopentadienylplatinum [$(CH_3)_3(CH_3C_5H_4)$Pt]
Gold; dimethyl(acetylacetonate)gold (III)

However, it has been determined that virtually any metal with ligands that has a vapor pressure can be used for the metallization process.

Results

The use of PECVD greatly increases the speed with which metallization is completed. The use of nanosprings or nanomats increases the active surface area. Following metallization, these nanostructures are useful in a number of applications such as gas or aqueous sensors, hydrogen storage structures, catalytic converters, and the like. In addition, a number of different metals have been successfully used for the metallization of different nanostructure types. Specifically, $SiO_2$, SiC and GaN nanostructures have been successfully synthesized using the techniques described herein. In addition, Au particles have been successfully attached to $SiO_2$ and GaN nanostructures. In addition, Ni particles and Pt particles have been successfully attached to $SiO_2$ and SiC nanostructures. Those skilled in the art will appreciate that other metals and other nanostructures may also be synthesized.

The combination of metallization particles and nanostructure may be selected for particular applications. For example, Au particles are particularly useful for operation as a catalytic converter. It has been found that Au particles on a GaN nanostructure is useful for gas detection.

Shown in FIGS. 12(a)-(c) are transmission electron microscope (TEM) images of Ni NPs formed on $SiO_2$ NWs. The NW in FIG. 12(a) is 100 nm in diameter and the Ni deposit was produced at a total chamber pressure of 17 Pa, while the substrate was heated to 573° K. The average NP size for this deposit was found to be 2 nm with a standard deviation of 0.5 nm. The inset of FIG. 12(a) is a high-resolution TEM (HR-TEM) image of a 5 nm NP showing the {111} planes and the monocrystalline nature of the particle. The NPs shown in FIG. 12(b) have an average size of 4 nm with a standard deviation of 1 nm and were produced at 873° K and 67 Pa on a NW with a 70 nm diameter. The distinct rings of the inset diffraction pattern in FIG. 12(b) confirm that the Ni NPs are crystalline and that they are randomly oriented on the substrate surface. FIG. 12(c) shows several NWs with diameters ranging from 20-40 nm. Deposition conditions in this case were a chamber pressure of 42 Pa and a substrate temperature of 873° K, resulting in an average Ni NP size of 6nm with a standard deviation of 1 nm. FIG. 12(d) shows a histogram of particle size measurements for Ni NPs deposited at 873 K and a chamber pressure of 67 Pa. From a deposition where the average NP size is approximately 4 nm the total surface area is 168 $m^2/g$.

FIG. 13 is a montage of TEM images of Pt NPs on $SiO_2$ NW substrates. The deposition conditions for the NPs shown in FIG. 13(a) were a chamber pressure of 17 Pa with a substrate temperature of 573° K. The inset of FIG. 13(b) is a HRTEM image of a 4 nm particle exhibiting a single crystal domain with lattice fringes corresponding to the {111} planes. The NPs in FIG. 13(b) were produced at 42 Pa and 723 K on a NW of 70 nm diameter. The distinct rings of the inset diffraction pattern in FIG. 13(b) indicate the crystalline nature of the Pt NPs. The deposition shown in FIG. 13(c) was made at 67 Pa and 873° K on a NW 35 nm in diameter. FIG. 13(d) shows a histogram for particle size measurements of Pt NPs deposited at 723° K at a chamber pressure of 42 Pa. The average particle size of all the Pt depositions was near 3 nm, corresponding to a surface area of 95 $m^2/g$.

TEM images of Au NPs formed on the NW substrates are shown in FIG. 14. The distinct rings of the inset diffraction pattern in FIG. 14(a) indicate the crystalline nature of the NPs. The $SiO_2$ NWs are amorphous as evidenced by the absence of clear diffraction maxima. The deposition conditions for the NPs in FIG. 14(a), on a wire 130 nm in diameter, were a substrate temperature of 573° K with a total chamber pressure of 17 Pa. The average NP size for this deposit was determined to be 5 nm, with a standard deviation of 1 nm. The NPs shown in FIG. 14(b) are 7 nm in diameter with a standard deviation of 2 nm. These NPs were produced at 723° K and 42 Pa on a NW approximately 100 nm in diameter. FIG. 14(c) shows a NW of 80 nm in diameter, deposition conditions were 873° K and 17 Pa, resulting in a particle size of 9 nm with a standard deviation of 13 nm. Close inspection of the images in FIG. 14(b) and FIG. 14(c) reveals the presence of two distinct NP sizes on each NW. The smallest particles have an average size of 2 nm in FIGS. 14(b) and 13 nm in FIG. 14(c).

The overall trends of the pressure and temperature effects on particle size were determined and are shown in FIG. 15. In FIG. 15(a) it can be seen that the particle size increases with pressure reaching a maximum at 142 Pa. After this maximum, a continued increase in total chamber pressure causes a decrease in particle size. Also shown in FIG. 15(a) is that as the temperature increases there is an overall increase in particle size. This trend is clearly evident in FIG. 15(b), which shows that as the substrate temperature increases there is a corresponding increase in particle size.

Shown in FIG. 16 are HRTEM images of Au NPs deposited on $SiO_2$ NWs at 723° K and 42 Pa. FIG. 16(a) shows a Au NP with a diameter of approximately 8 nm, the inset image is a Au NP 2 nm in diameter from a nearby location. FIG. 16(b) shows a faceted Au NP with a diameter of 3 nm. The lattice fringe spacing in this image was measured to be 0.23 nm, corresponding to the {111} planes of Au. The particles shown in FIG. 16(c) have diameters ranging from 15-9 nm. For NPs a significant fraction of atoms occupy surface sites. Not all the surface sites are equally active for specific reactions. Schimpf, S., M. Lucas, C. Mohr, U. Rodemerck, A. Brückner, J. Radnik, H. Hofmeister, and P. Claus. Supported gold nanoparticles: in-depth catalyst characterization and application in hydrogenation and oxidation reactions. *Catal. Today* 72, 63 (2002). For example, C═O groups are preferentially activated on {111} surfaces and C═C groups may be activated at corner and edge sites. The 3 nm Au NP shown in FIG. 16(b) has the cuboctahedron shape characteristic of many of the smallest particles seen in this study. For such a NP the relative frequency of atoms on corner, (100) face, edge, and (111) face sites is 0.05, 0.10, 0.25 and 0.60, respectively.

The metal coated nanowires can be formed into aqueous and gas sensors. The sensing is achieved through chemical reactions of species adsorbed onto the surfaces of the nanowires. Sensing can be achieved either through electrical or optical measurements, or the simultaneous use of both electrical and optical sensing. These sensors will be ideal for chemical sensing in gas or liquid environments. For example, these sensors may be ideal for ultrahigh sensing of in automobile exhaust systems, or water safety.

Preliminary studies of Au nanoparticle coated GaN nanowires as gas sensors have been conducted. The gas sensor consisted of a simple four contact design that allowed for current measurements to be conducted independent of the applied voltage. The sensor response was measured relative to vacuum. Displayed in FIG. 17 are the I-V curves for the nanowire sensor in vacuum, Ar, $N_2$ and methane. No change in the I-V curve is observed for Ar, a noble gas that should not produce a response, which indicates that any response is not due to pressure changes, but due to chemical sensing. The sensor did respond to $N_2$, which may be due to the fact that the nanowires are GaN. The largest response was to methane, which is to be expected. The process is reversible! This means that the sensor would not have to be refreshed between measurements.

The response ranges from 20% to 50% relative to the vacuum. On-going studies are exploring the sensitivity of the sensors and their ability to operate in ambient atmosphere. The ability to sense N2 is extremely valuable to the agricultural and water communities.

The major limitation with hydrogen based fuel cell technology is storage of hydrogen. The use of carbon nanotubes has been proposed but these suffer from low hydrogen release temperature. Dillon, A. C., K. M. Jones, T. A. Bekkedahl, C. H. Klang, D. S. Bethune, and M. J. Heben. Storage of hydrogen in single-walled carbon nanotubes. *Nature (London)* 386, 377 (1997). Chen, P., X. Wu, J. Lin, and K. L. Tan. High $H_2$ uptake by alkali-doped carbon nanotubes under ambient pressure and moderate temperatures. *Science* 285, 91 (1999).

Boron oxide has also been proposed. The problem with boron oxide is that it reacts with water, which changes the surfaceJhi, S-H., and Y-K. Kwon. Glassy materials as a hydrogen storage medium: Density functional calculations, *Phys. Rev. B.* 71, 035408 (2005)

The $SiO_2$ nanowires produced by the flow furnace technique may represent a possible approach to overcome this limitation. Recent theoretical studies suggest that amorphous materials with a significant fraction of ionic bonding represent the ideal case for attachment and release of hydrogen. Jhi, S-H., and Y-K. Kwon. Glassy materials as a hydrogen storage medium: Density functional calculations, *Phys. Rev. B.* 71, 035408 (2005). We have demonstrated that we can produce silica nanowires that have very large total surface areas as shown in FIG. 18. Surface area is an important requirement for efficient hydrogen storage and values of few thousand $m^2/g$ are required.

The structure of the silica nanowires is amorphous and the Si-O bond found in silica has about 50% ionic character. Silica is also a material with high temperature stability and is chemically stable in a variety of harsh environments. This combination of properties may make silica nanowires the ideal material for hydrogen storage applications. We have now demonstrated that we can form large numbers of silica nanosprings. This morphology increases the overall surface area still further. The surface area enhancement of nanosprings relative to nanowires is approximately an order of magnitude. Displayed in FIG. 19 is a SEM image of a nanospring sample.

The present disclosure demonstrates an economical, versatile technique with an effective 100% yield of nanosprings. This technique can be used to grow $SiO_2$ nanosprings on virtually any surface or geometry provided the substrate can withstand the process temperature.

The ability to grow high yield nanospring samples makes this process viable for commercialization and easy integration into designs such as catalytic converters or hydrogen storage. The nanosprings can be grown on plates that can be stacked to produce extremely high density hydrogen storage devices. Because they are in physical contact with the substrate control procedures such as electropotential induced desorption of hydrogen could be developed to control the rate of hydrogen delivery. The growth of nanoparticles on the surface of the nanosprings would give an added catalytic area of a factor of four relative to flat surfaces. The particular combination of substrate, nanostructure material and metal nanoparticles attached to the nanostructure are chosen based on the application. For example, a catalytic converter may use NiPt particles on $SiO_2$ while a gas sensor may use Au metal nanoparticles on a GaN nanostructure.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one"and indefinite articles such as "a" or "an" (e.g., "a" and or "an" should typically be interpreted to mean "at least one"or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

We claim:

1. A method for holding hydrogen, comprising:
exposing a gas containing hydrogen with a storage device, the storage device having a substrate, a plurality of nanostructures on at least a portion of the substrate, and a plurality of metal and/or metal alloy nanoparticles on the individual nanostructures, the nanostructures individually having an external surface with a surface ionization state less than a natural ionization state of the individual nanostructures; and
adsorbing hydrogen in the gas onto the external surface of the individual nanostructures.

2. The method of claim 1 wherein the adsorbed hydrogen causes the surface ionization state of the individual nanostructures to shift toward the natural ionization state.

3. The method of claim 1 wherein:
the adsorbed hydrogen is a first layer of hydrogen;
the method further comprises adsorbing a second layer of hydrogen onto the first layer of hydrogen; and
the second layer of hydrogen causes the surface ionization state of the individual nanostructures to shift closer toward the natural ionization state than the first layer of hydrogen.

4. The method of claim 1, further comprising desorbing at least some of the hydrogen from the nanostructures at a temperature of about $-50°$ C. to about $100°$ C.

5. The method of claim 1 wherein the nanostructures include a plurality of silicon oxide ($SiO_2$) nanosprings individually having an external surface with a surface ionization state between $Si^{3+}$ and $Si^{3.5+}$.

6. The method of claim 1 wherein the metal and/or metal alloy nanoparticles contain at least one of gold (Au), nickel (Ni), and platinum (Pt).

7. The method of claim 1 wherein adsorbing the hydrogen comprises adsorbing more than one layer of hydrogen onto the nanostructures at an ambient temperature.

8. The method of claim 1 wherein the nanostructures comprise nanosprings and/or nanowires composed of at least one of glass, ceramics and/or ceramic oxides.

9. An apparatus for holding hydrogen, comprising:
a substrate;
a plurality of nanostructures covering at least a portion of the substrate;
a plurality of metal and/or metal alloy nanoparticles on at least some of the nanostructures; and
wherein the nanostructures individually have a surface with a surface ionization state less than a natural ionization state of the individual nanostructures.

10. The apparatus of claim 9 wherein the nanostructures comprise nanosprings and/or nanocoils composed of at least one of silicon oxide, a ceramic, and/or a ceramic oxide.

11. The apparatus of claim 9 wherein the nanostructures cover at least a portion of an interior surface of the substrate.

12. The apparatus of claim 9, further comprising an activator configured to impart energy to the nanostructures to thereby desorb hydrogen from the nanostructures.

13. The apparatus of claim 9 wherein the metal and/or metal alloy nanoparticles on the individual nanostructures containing at least one of gold (Au), nickel (Ni), and platinum (Pt).

14. A system for holding hydrogen, comprising:
a container; and
a hydrogen storage apparatus in the container, wherein the hydrogen storage apparatus includes a substrate, a plurality of nanostructures covering at least a portion of the substrate, and a plurality of metal and/or metal alloy nanoparticles on at least some of the nanostructures, wherein the nanostructures individually have a surface ionization state less than a natural ionization state of the individual nanostructures.

15. The system of claim 14 wherein the nanostructures comprise nanosprings and/or nanocoils.

16. The system of claim 14 wherein the nanostructures are composed of at least one of silicon oxide, a ceramic, and a ceramic oxide.

17. The system of claim 14 wherein the nanostructures include a plurality of silicon oxide ($SiO_2$) nanosprings individually having an external surface with a surface ionization state between $Si^{3+}$ and $Si^{3.5+}$.

18. The system of claim 14, further comprising an activator configured to impart energy to the nanostructures to thereby desorb hydrogen from the nanostructures.

19. The system of claim 14 wherein the metal and/or metal alloy nanoparticles on the individual nanostructures containing at least one of gold (Au), nickel (Ni), and platinum (Pt).

20. The system of claim 14 wherein:
the nanostructures include a plurality of silicon oxide ($SiO_2$) nanosprings on at least a portion of the substrate;
the silicon oxide ($SiO_2$) nanosprings individually having a surface with a surface ionization state between $Si^{3+}$ and $Si^{3.5+}$; and
the metal and/or metal alloy nanoparticles containing nickel (Ni) and/or platinum (Pt) nanoparticles.

* * * * *